United States Patent
Almgren et al.

(10) Patent No.: US 7,630,930 B2
(45) Date of Patent: Dec. 8, 2009

(54) METHOD AND SYSTEM FOR PORTFOLIO OPTIMIZATION FROM ORDERING INFORMATION

(76) Inventors: Robert Frederick Almgren, 230 W. 79th St., Apartment 94N, New York, NY (US) 10024; Neil Andrew Chriss, 240 Riverside Blvd., #19 A, New York, NY (US) 10069

(*) Notice: Subject to any disclaimer, the term of this patent is extended or adjusted under 35 U.S.C. 154(b) by 529 days.

(21) Appl. No.: 11/065,527

(22) Filed: Feb. 24, 2005

(65) Prior Publication Data

US 2006/0190371 A1    Aug. 24, 2006

(51) Int. Cl.
    *G06Q 40/00*    (2006.01)
(52) U.S. Cl. .................................................. 705/36 R
(58) Field of Classification Search .......... 705/36 R–37
    See application file for complete search history.

(56) References Cited

U.S. PATENT DOCUMENTS

| | | | |
|---|---|---|---|
| 5,148,365 A | 9/1992 | Dembo | |
| 6,839,685 B1 | 1/2005 | Leistensnider et al. | |
| 2001/0042037 A1* | 11/2001 | Kam et al. | 705/36 |
| 2003/0055765 A1* | 3/2003 | Bernhardt | 705/36 |
| 2004/0083151 A1 | 4/2004 | Craig et al. | |
| 2004/0167843 A1* | 8/2004 | French | 705/36 |
| 2005/0033678 A1* | 2/2005 | Huneault | 705/36 |

OTHER PUBLICATIONS

PCT International Search Report.
Response to Written Opinion as filed in PCT/US2006/006627.
Written Opinion of the International Searching Authority.

* cited by examiner

*Primary Examiner*—C. Luke Gilligan
*Assistant Examiner*—Valerie Lubin
(74) *Attorney, Agent, or Firm*—Integral Patent Associates; Laurence J. Shaw

(57) ABSTRACT

A method of optimizing a portfolio includes selecting an investment universe with a finite number of assets, forming a belief matrix based on one or more homogeneous inequality relationships among the expected returns of assets in the universe, selecting those asset returns that are consistent with the belief matrix to form a consistent set of return vectors, selecting a set of allowable weight vectors for the assets in the universe, determining a centroid vector of the consistent set of return vectors with respect to a probability measure, and finding an optimal portfolio by finding a weight vector on a boundary of the set of allowable weight vectors that maximizes an inner product with the centroid vector.

34 Claims, 8 Drawing Sheets

METHOD AND SYSTEM FOR PORTFOLIO OPTIMIZATION FROM ORDERING INFORMATION

TECHNICAL FIELD

This invention is directed to methods of optimizing portfolios from one or more portfolio sorts and covariance data.

DISCUSSION OF THE RELATED ART

The classic portfolio construction problem is to construct an optimal investment list from a universe of assets. Modern Portfolio Theory (MPT), which began with Markowitz (1952), emphasizes the balancing of risk against return, and gave the first practical solution. In MPT one assumes that the first two moments of the joint return distribution of the portfolio assets have been reliably estimated. Markowitz proposed that a risk-averse investor seeks to find a vector w of portfolio weights representing a compromise between the two goals, maximizing return while minimizing risk, which can be expressed by $$\max_w(w^T R), \text{ and } \min_w(w^T V w),$$

where R is a (column) vector of expected returns, V is the covariance matrix of those assets' returns, and T denotes transpose. The set of extreme points for this problem constituted a one parameter family of solutions, from among which the investor would choose his preferred portfolio. This expectation-variance ("E-V") construction gave a plausible explanation for the importance of diversification.

Later work interpreted this as maximization of a concave utility function, and allowed for the imposition of additional constraints on the relative weights w such as no short sales, position limits, etc.

A formulation of the problem that is more representative of real practice in asset management seeks to maximize a portfolio's expected return subject to a set of constraints, such as portfolio total variance (a risk budget). For example, if the maximal total variance limit is set to or 2, then the problem may be formulated as $$\max_{w^T V w \leq \sigma^2} (w^T R).$$

Standard mathematical techniques such as Lagrange multipliers can transform the MPT problem into the one above.

This formulation is used frequently when it is possible to make estimates of the expected returns and covariance matrix V. Practitioners justify the use of the above formulation of the problem by assuming that either (a) the joint distribution of returns is normal, or (b) that the investor's utility depends only on the first two moments of the distribution. Both justifications have gained enough acceptance in practice to make this formulation of the portfolio problem almost universally accepted as the "gold standard" of optimization problems in finance.

One method, referred to as robust optimization, recognizes that the actual expected return vector may not be exactly equal to the single given vector. A probability density is introduced centered on the given vector, and various minimax techniques are used to generate optimal portfolios.

In the absence of expected returns, it is not clear how to generalize this approach to portfolio selection. On the other hand, ordering information has become increasingly important to the financial literature and the investment process. However, a difficulty in constructing portfolios from ordering information is that there is no obvious objective function that naturally relates to it. One can construct an objective function in one of several ways, including estimating expected returns from the data that gives rise to the ordering information. One can also develop ad hoc rules relating such characteristics to expected returns and proceed in the same manner. One can also develop ad hoc rules for constructing portfolios from ordering information, such as buying the top decile of stocks and selling the bottom decile.

SUMMARY OF THE INVENTION

Exemplary embodiments of the invention as described herein generally include methods and systems for portfolio optimization based on replacing expected returns with homogeneous linear inequality criteria, more specifically, with information about the order of the expected returns but not their values. Disclosed herein are methods for constructing portfolios from sorting information, that is, from information concerning the order of expected returns in a portfolio of stocks.

According to an aspect of the invention, there is provided a method for optimizing a portfolio, said method including receiving a criteria for providing an investment universe with a finite number of assets, and selecting said investment universe, receiving a set of beliefs concerning the expected returns of assets in the universe and forming a belief matrix from said beliefs, selecting those asset returns that are consistent with the belief matrix to form a consistent set of return vectors, determining a set of allowable weight vectors for the assets in the universe, determining a centroid vector of the consistent set of return vectors with respect to a probability measure, and finding an optimal portfolio by finding a weight vector in the set of allowable weight vectors that maximizes an inner product with the centroid vector.

According to an aspect of the invention, there is provided a method for optimizing a portfolio, said method including receiving a criteria for providing an investment universe with a finite number of assets, and selecting said investment universe, receiving a set of beliefs concerning the expected returns of assets in the universe and forming a belief matrix from said beliefs, selecting those asset returns that are consistent with the belief matrix to form a consistent set of return vectors, determining a set of allowable weight vectors for the assets in the universe, determining a centroid vector of the consistent set of return vectors with respect to a probability measure, selecting a first weight vector from the allowable set and calculating a first inner product of the first weight vector and the centroid, selecting a second weight vector from the allowable set and calculating a second inner product of the second weight vector and the centroid, comparing the first inner product with the second inner product and selecting the weight vector corresponding to an inner product of greater magnitude as an optimal portfolio, and outputting the optimal portfolio. In a further aspect of the invention, once an optimal portfolio has been selected, considering the optimal portfolio as the first weight vector and its associated inner product the first inner product, the method includes repeating the steps of selecting a second weight vector and calculating a second inner product, and comparing the first inner product with the second inner product to determine another optimal weight vector corresponding to an inner product of greater magnitude.

According to another aspect of the invention, there is provided a program storage device readable by a computer, tangibly embodying a program of instructions executable by the computer to perform the method steps for determining an efficient portfolio, said method including providing an investment universe with a finite number of assets, forming a belief matrix based on homogeneous inequality relationships among the expected returns of assets in the universe, selecting those asset returns that are consistent with the belief matrix to form a consistent set of return vectors, selecting a set of allowable weight vectors for the assets in the universe, selecting a weight vector on a boundary of the set of allowable weight vectors, determining a normal to a supporting hyperplane of the allowable weight vectors at the selected weight vector, and determining whether the selected weight vector is an efficient portfolio, wherein if the normal at the selected weight vector is contained in a signed consistent cone of the consistent set, and if the normal is either a strict normal or is contained in a relative interior of the signed consistent cone, the selected weight vector is an efficient portfolio. In a further aspect of the invention, the method further comprises the steps of, if the selected weight vector is not an efficient portfolio, repeating the steps of selecting a weight vector, determining the normal to a supporting hyperplane of the set of allowable weight vectors, and determining whether the selected weight vector is an efficient portfolio.

According to another aspect of the invention, there is provided a program storage device readable by a computer, tangibly embodying a program of instructions executable by the computer to perform the method steps for optimizing a portfolio, said method including providing an investment universe with a finite number of assets, forming a belief matrix based on one or more homogeneous inequality relationships among the expected returns of assets in the universe, selecting those asset returns that are consistent with the belief matrix to form a consistent set of return vectors, determining a set of allowable weight vectors for the assets in the universe, determining a centroid vector of the consistent set of return vectors with respect to a probability measure, and finding an optimal portfolio by finding a weight vector in the set of allowable weight vectors that maximizes an inner product with the centroid vector.

According to another aspect of the invention, there is provided a program storage device readable by a computer, tangibly embodying a program of instructions executable by the computer to perform the method steps for providing a preferred portfolio, said method including selecting an investment universe with a finite number of assets, forming a belief matrix based on one or more homogeneous inequality relationships among the expected returns of assets in the universe, selecting those asset returns that are consistent with the belief matrix to form a consistent set of return vectors, determining a set of allowable weight vectors for the assets in the universe, selecting a first candidate portfolio from the allowable set, selecting a second candidate portfolio from the allowable set, forming a first subset of consistent return vectors for which the first candidate portfolio has a better expected return than the second candidate portfolio, forming a second subset of consistent return vectors for which the second candidate portfolio has a better expected return than the first candidate portfolio, comparing a probability measure of the first subset to a probability measure of the second subset, and selecting a candidate portfolio whose subset of consistent return vectors has a greater probability magnitude as a preferred portfolio. In a further aspect of the invention, the method includes, once a candidate portfolio has been selected as the preferred portfolio, considering the preferred portfolio as the first candidate portfolio, repeating the steps of selecting a second candidate portfolio, forming a first subset, forming a second subset, and comparing the probability measure to select another preferred portfolio whose subset of consistent return vectors has the greater probability magnitude.

According to another aspect of the invention, there is provided a program storage device readable by a computer, tangibly embodying a program of instructions executable by the computer to perform the method steps for optimizing a portfolio, said method including providing an investment universe with a finite number of assets, forming a belief matrix based on one or more homogeneous inequality relationships among the expected returns of assets in the universe, selecting those asset returns that are consistent with the belief matrix to form a consistent set of return vectors, determining a set of allowable weight vectors for the assets in the universe, determining a centroid vector of the consistent set of return vectors with respect to a probability measure, selecting a first weight vector from the allowable set and calculating a first inner product of the first weight vector and the centroid, selecting a second weight vector from the allowable set and calculating a second inner product of the second weight vector and the centroid, and comparing the first inner product with the second inner product and selecting the weight vector corresponding to an inner product of greater magnitude as an optimal portfolio. In a further aspect of the invention, once an optimal portfolio has been selected, considering the optimal portfolio as the first weight vector and its associated inner product the first inner product, the method includes repeating the steps of selecting a second weight vector and calculating a second inner product, and comparing the first inner product with the second inner product to determine another optimal weight vector corresponding to an inner product of greater magnitude.

In a further aspect of the invention, the set of allowable weight vectors is determined based on one or more constraints on the universe. In a further aspect of the invention, the constraints include a risk limit, a total investment limit, a liquidity restriction, a risk constraint with market neutrality, or a transaction cost limit.

In a further aspect of the invention, the homogeneous inequality relationships comprise an ordering of the assets in the universe. In a further aspect of the invention, a plurality of sorts are performed on the assets of the universe, a consistent set of return vectors is formed associated with each sort criteria, and the centroid is determined under a probability measure that gives equal weight to each consistent set. In a further aspect of the invention, the assets of the universe are divided into sectors, and the assets within each sector are ordered according to a separate criteria. In a further aspect of the invention, if the order of assets in a sector has no significance, the method further comprises the step of computing a superposition of centroids of the remaining sectors of assets for which the expected returns have significance, and averaging the centroid components within the sector where the ordering has no significance.

In a further aspect of the invention, the probability measure is spherically symmetric and decreases sufficiently rapidly with increasing radius so that a total probability measure is finite. In a further aspect of the invention, the probability measure h is defined by $$h(\rho) = C\rho^{n-1}\exp(-\rho^2/2R^2),$$

where $\rho$ is a magnitude in the set of return vectors, n is the dimensionality of the vectors, R is a cutoff magnitude, and C is a normalization constant chosen so that the total probability measure is equal to one. In a further aspect of the invention, the probability measure is a distribution uniform on a sphere of radius R.

In a further aspect of the invention, determining the centroid comprises a Monte Carlo computation. In a further aspect of the invention, if the assets of the universe are divided into sectors, the centroid is calculated by performing a Monte Carlo calculation in each sector, and forming a superposition of the centroid of each sector. In a further aspect of the invention, the step of determining the centroid comprises calculating the expression $$c_{j,n} = \frac{n!}{(j-1)!(n-j)!} \int_{-\infty}^{\infty} w F(w)^{n-j} (1-F(w))^{j-1} f(w)\, dw$$
$$= \frac{n!}{(j-1)!(n-j)!} \int_{0}^{1} F^{-1}(z) z^{n-j} (1-z)^{j-1}\, dz,$$

wherein $c_{j,n}$ is the jth component of an n-dimensional centroid vector, $f(w)$ is the probability density, and $F(w)$ is a cumulative distribution of $f(w)$, and $w$ is defined by $$\text{Prob}\{w < y_{j,n} < w + dw\} = \frac{n!}{(j-1)!(n-j)!} F(w)^{n-j}(1-F(w))^{j-1} f(w)\, dw,$$

wherein $y_{j,n}$ is a jth component of a vector comprising the asset universe sorted into decreasing order. In a further aspect of the invention, if both j and n are large, approximating the integral by either $F^{-1}(z_{mean})$ wherein $$z_{mean} = \frac{n-j+1}{n+1}, \text{ or } F^{-1}(z_{max})$$

wherein $$z_{max} = \frac{n-j}{n-1}.$$

In a further aspect of the invention, if the probability distribution is a normal distribution, approximating the integral by the Blom approximation $$c_{j,n} \approx F^{-1}\left(\frac{n+1-j-\alpha}{n-2\alpha+1}\right),$$

wherein $\alpha$ is a parameter in the range from about 0 to about 1. In a further aspect of the invention, $\alpha$ is defined by the formula $\alpha = A - Bj^{-\beta}$, wherein A, B, and $\beta$ are determined by comparing the Blom approximation to a numerical integration of the expression for $c_{j,n}$. In a further aspect of the invention, A is about 0.4424, B is about 0.1185, and $\beta$ is about 0.21.

According to another aspect of the invention, there is provided a program storage device readable by a computer, tangibly embodying a program of instructions executable by the computer to perform the method steps for optimizing a portfolio, said method including providing an investment universe with a finite number of assets, forming a belief matrix from one or more beliefs concerning the expected returns of assets in the universe, wherein the one or more beliefs are in the form of one or more homogeneous inequality relationships among the expected returns, wherein the homogeneous inequality relationships comprise an ordering of the assets in the universe, selecting those asset returns that are consistent with the belief matrix to form a consistent set of return vectors, and determining a centroid vector of the consistent set of return vectors with respect to a probability measure. In a further aspect of the invention, the method includes determining a set of allowable weight vectors for the assets in the universe, wherein the set of allowable weight vectors is determined based on one or more constraints on the universe, and finding an optimal portfolio by finding a weight vector in the allowable set that maximizes an inner product with the centroid.

These and other exemplary embodiments, features, aspects, and advantages of the present invention will be described and become more apparent from the detailed description of exemplary embodiments when read in conjunction with accompanying drawings.

DETAILED DESCRIPTION OF THE PREFERRED EMBODIMENTS

Figure 1:
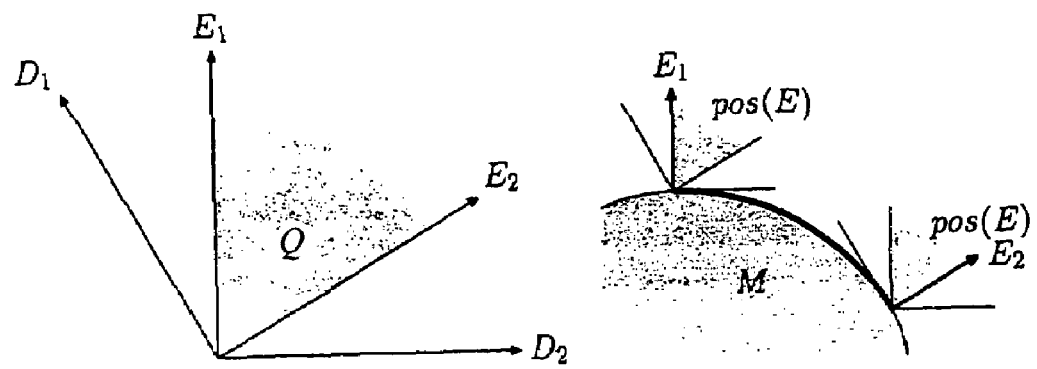
FIG. 1 depicts the geometry for three assets, with two sorting conditions, according to an embodiment of the invention.

Exemplary embodiments of the invention are described below. In the interest of clarity, not all features of an actual implementation which are well known to those of skill in the art are described in detail herein.

Portfolio Theory

A portfolio can be regarded as list of dollar investments in some finite set of assets $S_i$. For expository purposes herein, an asset can be regarded as a stock, however, the methods disclosed herein are applicable to any type of financial or investment instrument, including real estate. This list of dollar investments can be represented by a vector $w=(w_1, \ldots, w_n)$ of weights, referred to herein as a portfolio vector, wherein each element $w_i$ of the weight vector represents the investment in stock $S_i$. The expected returns for the n assets of a portfolio can be represented by a vector $r=r_1, \ldots, r_n)$, referred to herein as a return vector, and the expected return of a portfolio as a whole is $w^T r$. The notation used herein assumes vectors to be column vectors, with $^T$ denoting transpose. Thus, the matrix product $w^T r$ is equivalent to the standard Euclidean inner product $w \cdot r$.

A cone is a set of vectors Q defined by the relation $\lambda r \in Q$ if $r \in Q$ and $\lambda > 0$. Define $\overline{Q} = \{\lambda \rho | \lambda \geq 0\}$ be the smallest cone that contains $\rho$, and $Q = \{r \in R^n | \rho^T r \geq 0\}$ as the half-space whose inward normal is $\rho$. The subspace of weight vectors defined by $$Q^\perp = \{r \in R^N | \rho^T r = 0\},$$

referred to as the orthogonal subspace, is the complete set of portfolios that provide no expected return given $\rho$. Let $$Q^* = (Q^\perp)^\perp = \{w \in R^N | w^T r = 0 \text{ for all } r \in Q^\perp\}$$

be the orthogonal subspace to $Q^\perp$. This subspace contains $\rho$ but is larger; in particular it contains negative multiples of the base vector $\rho$. Then every portfolio w may be written uniquely as $$w = w_0 + w_\perp \text{ with } w_0 \in Q^* \text{ and } w_\perp \in Q^\perp.$$

$Q^*$ is the relevant subspace as defined by the expected return vector $\rho$. Since $w_\perp^T r = 0$, the component $w_\perp$ has no significance for the expected return forecast. One can think of $w_0$ as the component of w relevant to the belief that the expected return vector is r.

Portfolio preference can now be defined, according to an embodiment of the present invention. A portfolio w is preferable to a portfolio v if and only if it provides better returns than v. Using the symbol $\succeq$ to denote preference between portfolios:

$$w \succeq v \text{ if and only if } w_0^T r \geq v_0^T r \text{ for all } r \in Q.$$

Note that it is only the direction of a return vector that matters for finding a preferred portfolio, not its magnitude. The goal is to find preferred portfolio vectors under the partial order $\succeq$, subject to any constraints that may be imposed such as risk limits or total investment limits. This goal is equivalent to maximizing the scalar quantity $w^T r$ for a given level of variance.

Portfolio Sorts

A portfolio sort can be defined as any sort of inequality belief among the expected returns of a set of assets. The simplest example is a complete sort in which assets have been sorted in order of expected return. A sort can be represented as an ordering of assets within a portfolio that corresponds to the ordering of expected returns, or more generally, to a wide variety of homogenous inequality beliefs. A portfolio sort can break assets into a set of sub-groups (e.g., sectors) and orders the assets according to beliefs within each subgroup. If there is a single subgroup, then the sort is called a complete sort, otherwise it is known as an incomplete sort.

Thus, according to an embodiment of the invention, given a universe of assets with expected returns $r=(r_1, \ldots, r_n)$ the assets can be characterized by a set of beliefs represented by a set of homogeneous inequality relationships among the expected returns of assets in the universe. These inequality relationships can include one or more ordering relationships that form the basis of a sort of the expected returns. It can be assumed that the investor does not know r, but rather has m distinct beliefs about the components of r. These beliefs form the basis of the sort, and can be expressed as m inequalities such as $r_i \geq r_j$ or $ar_i + br_j \geq r_k$. Restricting the beliefs to homogenous linear relationships, with no constant term, each belief can be expressed as a linear combination of expected returns being greater than or equal to zero, e.g.

$$ar_i + br_j - r_k \geq 0.$$

Each belief may be expressed in a mathematically compact form by placing the coefficients of the above inequalities into a column vector $D_1$ and writing the inequality as $D_1^T r \geq 0$. For example, given the inequality $4r_2 + 2r_3 - r_4 \geq 0$, one would write $D_1 = (0, 4, 2, -1, 0, \ldots, 0)^T$.

For each belief one can have one belief vector, and all the beliefs can be written as column vectors $D_1, \ldots, D_m$ containing the coefficients of the inequalities as above. Each vector $D_j$ is referred to herein as a belief vector. The total set of beliefs can be expressed as $Dr \geq 0$, where D is an m×n belief matrix whose rows are $D_1^T, \ldots D_m^T$, and a vector is $>0$ if and only if each of its components is nonnegative. The set of vectors is assumed to be linearly independent, so that they form a basis for the subspace span $(D_1, \ldots, D_m)$. There is no restriction on the number of beliefs, except that they admit a set of expected returns with a non-empty interior. This excludes the use of opposing inequalities to impose equality conditions.

A vector of expected returns $r=(r_1, \ldots r_n)$ is consistent with D if it satisfies the given set of inequality conditions. That is, a consistent return vector is one that could occur given the beliefs. According to an embodiment of the present invention, the set of consistent expected returns, referred to herein as the consistent cone, can be written as $$Q = \{r \in R^N | Dr \geq 0\} = \{r \in R^N | D_j^T r \geq 0 \text{ for each } j=1, \ldots, m\}.$$

This is a cone in the space $R^N$ of all possible expected returns, and it is the natural generalization of the previous definition of a cone to the case of inequality information. Any vector $r \in Q$ may be the actual expected return vector.

A simple example is that of a complete sort, where assets have been sorted so that $$r_1 \geq r_2 \geq \ldots \geq r_n.$$

There are $m=n-1$ beliefs of the form $r_j - r_{j+1} \geq 0$ for $j=1, \ldots, n-1$. The belief vectors are of the form $D_j = (0, \ldots, 0, 1, -1, 0, \ldots, 0)^T$, and the matrix D is (empty spaces are zeros)

$$D = \begin{pmatrix} D_1^T \\ \vdots \\ D_m^T \end{pmatrix} = \begin{pmatrix} 1 & -1 & & & \\ & 1 & -1 & & \\ & & \ddots & \ddots & \\ & & & 1 & -1 \end{pmatrix}.$$

The consistent cone is a wedge shape in $R^n$, with a spine along the diagonal $(1, \ldots, 1)$ direction.

Portfolio Comparison

Note that the return vector r and the portfolio vector w live in different spaces: the space of all possible returns will be denoted herein by R and the space of all possible portfolios will be denoted herein by W.

For any consistent cone $Q=\{Dr \geq 0\} \subset R$, define the subspaces $$Q^{\perp} = \{r \in R^N | Dr=0\} = Q \cap (-Q)$$

$$Q^* = (Q^{\perp})^{\perp} = \{w \in R^N | w^T r = 0 \text{ for all } r \in Q^{\perp}\}.$$

By standard linear algebra, $$Q^* = \text{span}(D_1, \ldots, D_m) = \{D^T x | x \in R^m\}$$

the subspace spanned by the rows of D. $Q^*$ is the relevant subspace. Then, for any portfolio w one can again write $$w = w_0 + w_{\perp} \text{ with } w_0 \in Q^* \text{ and } w_{\perp} \in Q^{\perp}.$$

Thus, the space of portfolios is partitioned into parallel, relevant, components and orthogonal, irrelevant, components.

According to an embodiment of the present invention, the portfolio comparison relation can be restated in terms of relevant components. Given two portfolios w, v, decompose them into parallel parts $w_0, v_0 \in Q^*$ and orthogonal parts $w_{\perp}, v_{\perp} \in Q^{\perp}$. Then, $$w \succeq v \text{ if and only if } w_0^T r \geq v_0^T r \text{ for all } r \in Q.$$

That is, w is preferred to v if and only if its relevant part $w_0$ has a higher expected return than the relevant part $v_0$ of v; the orthogonal parts $w_{\perp}, v_{\perp}$ are not used in the comparison.

Since any candidate return vector $r = r_0 + r_{\perp}$, an equivalent relation is $$w \succeq v \text{ if and only if } w^T r \geq v^T r \text{ for all } r \in \overline{Q},$$

where $\overline{Q} = Q \subset Q^*$. Here, $\overline{Q}$ is referred to as the signed consistent cone: it is the consistent cone with those components that can have either sign filtered out. For example, if we have beliefs $x \geq 0$ and y=anything, $\overline{Q}$ is then restricted to the set $x \geq 0$ and y=0. Thus, testing the relevant part of the portfolio weight vector against all consistent returns is equivalent to testing the entire weight vector against returns for which there is a sign belief.

According to an embodiment of the present invention, $\overline{Q}$ can be characterized as a positive span of a set of basis vectors, that is, an n×m matrix E so that $\overline{Q} = \{Ex | x \geq 0 \text{ in } R^m\}$. In general, finding the columns $E_1, \ldots, E_m$ of E is equivalent to finding a convex hull. However, if the $D_1, \ldots D_m$ are linearly independent, which requires that $m \leq n$, then E can be found as the Moore-Penrose pseudo-inverse of D: span $(E_1, \ldots, E_m) = \text{span}(D_1, \ldots, D_m)$ and $E_i^T D_j = \delta_{ij}$.

According to an embodiment of the present invention, strict preference can be defined by $$w \succ v \text{ if and only if } w \succeq v \text{ and } \sim(v \succeq w),$$

which is equivalent to $$w \succ v \text{ if and only if } w^T r \geq v^T r \text{ for all } r \in \overline{Q},$$

and $$w^T r > v^T r \text{ for at least one } r \in \overline{Q}.$$

This notion of preference does not mean that portfolio w produces a higher return than portfolio v for every consistent return r, since the portfolios w and v may have different exposure to components of the return vector, such as the mean, about which there is no information or opinion, and which may have either sign. Furthermore, not every pair of portfolios w, v can be compared. If $w_0$ and $v_0$ are such that there are some $r \in Q$ for which $w_0^T r > v_0^T r$, and also some $r \in Q$ for which $v_0^T r > w_0^T r$, then neither $w \succeq v$ nor $v \succeq w$ is true.

Efficient Portfolios

In modern portfolio theory, a portfolio that provides a maximal level of expected return for a given level of variance is called an efficient portfolio. According to an embodiment of the present invention, an efficient portfolio can be regarded as a maximally preferable portfolio chosen subject to constraints such as portfolio total variance, total investment caps, liquidity restrictions, or transaction cost limits. Let $M \subset R^n$ denote a set of allowable portfolio weight vectors that satisfy a set of constraints. A particular portfolio weight vector w is said to be efficient in M if there is no $v \in M$ with $v \succ w$. That is, there is no other allowable portfolio that dominates w, in the sense defined above. This does not mean that $w \succeq v$ for all $v \in M$, for there can be many v for which neither $w \succeq v$ nor $v \succeq w$ holds.

The efficient set $\hat{M} \subset M$ can be defined as, according to an embodiment of the present invention:

$$\hat{M} = \{w \in M | w \text{ is efficient in } M\}.$$

The efficient portfolios are not unique and in fact for typical sets M the efficient set can be rather large. However, when compared to the entire constraint set, the efficient set is relatively small, on the order of less than 1/n! the measure of the constraint set, where n is the number of assets in the portfolio. The sets $\hat{M}$ are convex, but do not typically have smooth surfaces. Intuitively, a convex set is one that curves away from the viewer. More precisely, any two points in a convex set can be connected by a line segment in that set.

In order to provide a criteria for determining an efficient portfolio, more terminology is helpful. A hyperplane in $R^n$ is a plane of dimension (n−1), and has a unique normal vector. A hyperplane that is tangent to the boundary of M is referred to as a supporting hyperplane. Since M is convex, the whole set M is on one side of the hyperplane.

A normal to a supporting hyperplane for M at w, where w is on the boundary of M, is a vector $b \in R^n$ such that $b^T(v-w) \leq 0$ for $v \in M$. A strict normal is one for which $b^T(v-w) < 0$ for $v \in M, v \neq w$. For the sake of brevity, the "normal to a supporting hyperplane" is referred to below as the normal.

The interior of the consistent cone can be defined as $$Q^\circ = \{r \in R^n | Dr > 0\},$$

and its planar restriction, the relative interior of $\overline{Q}$ in $Q^*$ as $$\overline{Q}^\circ = Q^\circ \cap Q^*.$$

The condition for a portfolio w to be efficient can now be stated, according to an embodiment of the present invention. Suppose the set of allowable portfolio weights M has a supporting hyperplane at w whose normal b has $b \in \overline{Q}$. If b is a strict normal, or if $b \in \overline{Q}^\circ$, then w is efficient in M.

Conversely, suppose that Q has a non-empty interior and that M is convex. If w is efficient in M, then there is a supporting hyperplane to M at w whose normal b has $b \in \overline{Q}$.

To summarize, a portfolio w is efficient in M if and only if M has a supporting hyperplane at w whose normal lies in both the cone Q and the hyperplane.

Figure 7:
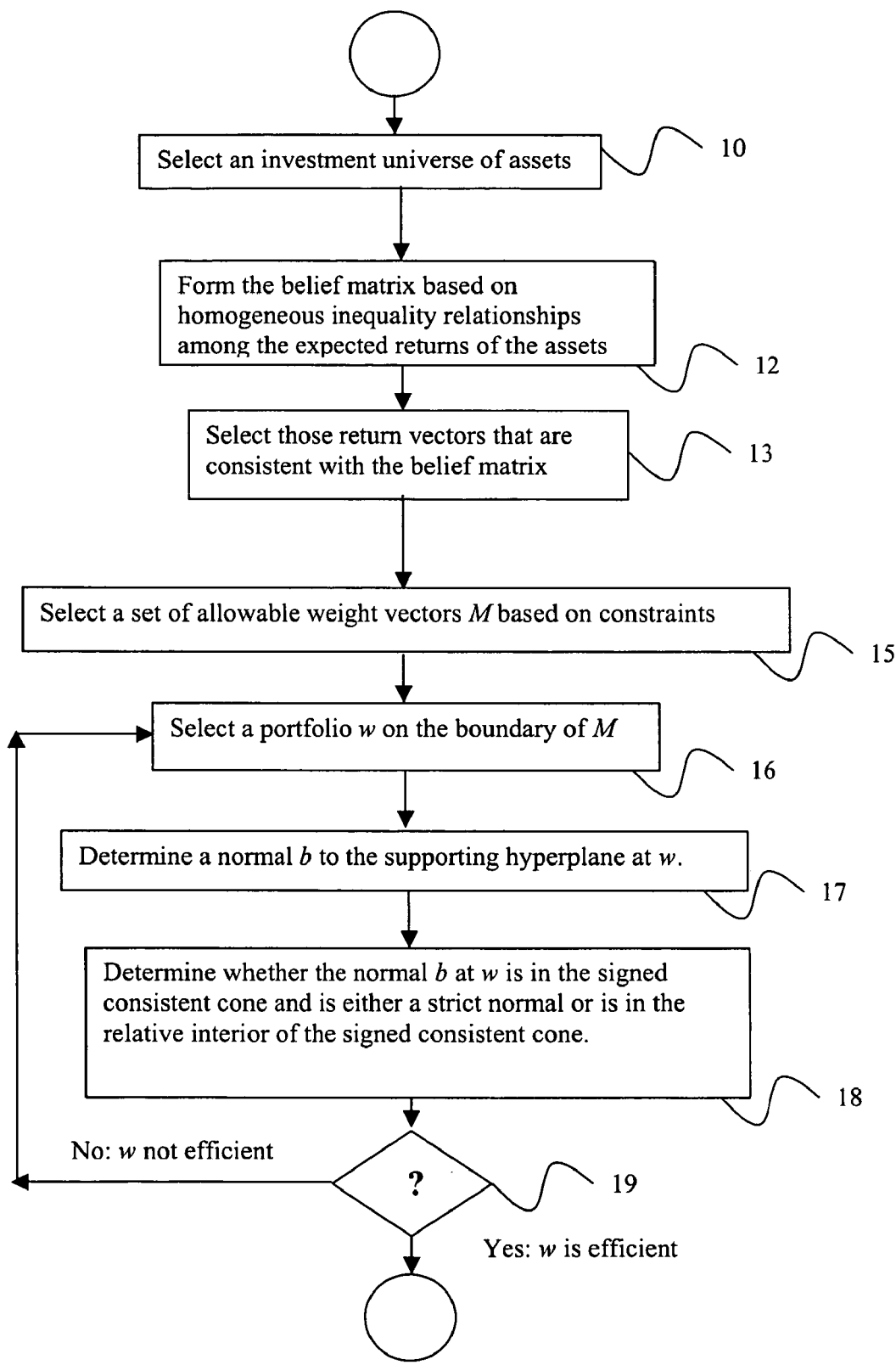
FIG. 7 presents a flow chart of a preferred method of determining an efficient portfolio according to one embodiment of the invention.

A method of determining an efficient portfolio according to one embodiment of the present invention is illustrated in FIG. 7. Starting at step 10, an investor is provided with an investment universe containing a finite number of assets. At step 11, the investor forms a belief matrix D based on his or her beliefs regarding the assets in the universe, as expressed by one or more homogeneous inequality relationships among the expected returns of assets in the universe. Ordering relationships are a special case of homogeneous inequality relationships, and can form the basis a sort based on the expected return of each asset. At step 13, the investor selects those return vectors Q that are consistent with the belief matrix to form a consistent set. The investor also selects a set of allowable weight vectors M at step 15, as determined by, for example, a set of constraints. These constraints include one or more of a total investment limit, a risk limit, a risk limit with market neutrality, a liquidity restriction, and a transaction cost limit. Then, the investor selects a portfolio w on the boundary of M at step 16. At step 17, the investor determines a normal b to the supporting hyperplane at w, and whether, at step 18, the normal b at w is contained in the signed consistent cone $\overline{Q}$ and is either a strict normal or is in the relative interior of the signed consistent cone $\overline{Q}°$. If, at step 19, this is true, then w is efficient, that is, maximally preferable in M, otherwise the investor can return to step 16 to select another portfolio.

As an example, suppose it is believed that the market, defined by equal weightings of all assets, will not go either up or down, and there are no beliefs regarding the relative motions of the components. This can be expressed as $r_1+\ldots+r_n=0$, or by setting $D_1=(1,\ldots,1)^T$ and $D_2(-1,\ldots,-1)^T$. The consistent cone is then $Q=\{r=(r_1,\ldots,r_n) \mid r_1+\ldots+r_n=0\}$ which has an empty interior. There are no pairs of portfolios for which w ≻ v, and every point is efficient.

As another example, FIG. 1 depicts the geometry for three assets, with two sorting conditions. This is the simplest non-trivial example, that of three assets with a complete sort. The difference vectors and their duals are:

$$D_1^T = (1, -1, 0), D_2^T = (0, 1, -1),$$

$$E_1^T = \frac{1}{3}(2, -1, -1),$$

$$E_2^T = \frac{1}{3}(1, 1, -2),$$

so that $D_i^T E_j = \delta_{ij}$. The angle between $D_1$ and $D_2$ is 120°, the angle between $E_1$ and $E_2$ is 60°, and they all lie in the plane Q whose normal is $(1, 1, 1)^T$, the plane of the image as depicted in FIG. 1.

Referring to FIG. 1, the view is from the direction of $(1, 1, 1)^T$, so the image plane is Q. The left panel is in the space of expected return r, with $D_1$ and $D_2$ being the belief vectors and $E_1$ and $E_2$ are their corresponding dual vectors, and where Q is the consistent set. The full three-dimensional shape is a wedge extending perpendicular to the image plane. The right panel shows a smooth constraint set M of portfolio vectors w; the efficient set is the shaded arc, where the normal is in the positive cone of $E_1$, $E_2$. Along this arc, the normal must be in the image plane; if M is curved in three dimensions, then the efficient set is only this one-dimensional arc.

EXAMPLES

The following examples illustrate methods according to an embodiment of the present invention for determining efficient portfolios in a non-limiting, exemplary set of situations.

1. Total Investment Constraint

The first example considers the case where the total investment is limited to W dollars, with long or short positions permitted in any asset. Take $$M=\{w \in R^n \mid |w_1|+\ldots+|w_n| \leq W\}.$$

Consider first the case of a single sorted list. Start with a portfolio weighting $w=(w_1,\ldots,w_n)$. If $w_j>0$ for some $j=2,\ldots,n$, then form the portfolio $w_0=(w_1+w_j,\ldots,0,\ldots,w_n)$, in which the component $w_j$ has been set to zero by moving its weight to the first element. This has the same total investment as w if $w_1 \geq 0$, and strictly less if $w_1<0$. It is more optimal since the difference $w'-w=(w_j,\ldots,-w_j,\ldots)=(D_1+\ldots+D_{j-1})$ is a positive combination of difference vectors.

Similarly, if any $w_j<0$ for $j=1,\ldots,n-1$, define a more optimal portfolio $w'=(w_1,\ldots,0,\ldots,w_n+w_j)$, which has the same or less total investment, and is more optimal than w.

Thus, the only possible maximal portfolios are of the form $$w=(w_1, 0, \ldots, 0, w_n)$$

with $$w_1 \geq 0, w_n \leq 0, \text{ and } |w_1|+|w_n|=W,$$

and it is not hard to see that all such portfolios are maximal. This is the classic portfolio of going maximally long the most positive asset, and maximally short the most negative asset.

By similar reasoning, the efficient portfolios in the case of multiple sectors are of the form $$(w_1, \ldots, w_{m_1}, \ldots, w_{m_1+\ldots+m_{k-1}+1}, \ldots, w_n)$$

with $$w_1, \ldots, w_{m_1+\ldots+m_{k-1}+1} \geq 0 \text{ and } w_{m_1}, \ldots w_n \leq 0.$$

Within each sector, one goes long the top asset and short the bottom asset, but any combination of sector weightings is acceptable.

2. Risk Constraint

The next example considers risk constraint. Here, take $M=\{w \in R^n \mid w^T V w \leq \sigma^2\}$, where V is the variance-covariance matrix of the n assets and σ is the maximum permissible volatility. This set is a smooth ellipsoid, and at each surface point w it has the unique normal b=Vw (up to multiplication by a positive scalar). Conversely, given any vector $b \in R^n$, there is a unique surface point w in M having normal b; w is a positive multiple of $V^{-1}b$.

By the theorems, $W \in M$ is efficient if and only if $b \in \overline{Q}$, so one can parameterize the set M of efficient points by b=Ex with $x \in R^m$ with $x \geq 0$. This can be written explicitly as $$w = V^{-1}\sum_{j=1}^{m} x_j E_j$$

with appropriate scaling so $w^T V w=\sigma^2$.

The efficient set $\hat{M}$ thus defined is a portion of the surface of the risk ellipsoid intersected with the plane where the local normal is in $\overline{Q}$. For example, in the case of a single sort it is a distorted simplex with n−1 vertices corresponding to only a single $x_j$ being nonzero. In general, each of the n! possible orderings gives a different set $\hat{M}$, and the set of these possibilities covers the whole set $M \cap V^{-1}\overline{Q}$. That is, the size of $\hat{M}$ is 1/n! of the entire possible set.

To select a single optimal portfolio, one must select one point within this set. One example is the "center" point with $x=(1, \ldots, 1)$, which gives $b=E_1+ \ldots +E_m$. In the case of a single sorted list, this gives the linear return vector $$b_i = \sum_{j=1}^{n-1} E_{ij} = \frac{n+1}{2} - i.$$

This result should be multiplied by $V^{-1}$ and scaled to obtain the actual weights.

3. Risk Constraint with Market Neutrality

The next example considers risk constraint with market neutrality. Suppose that two constraints are imposed. First, require that the portfolio have a maximum level of total volatility as described above. Second, require that the portfolio be market-neutral, meaning that $\mu^T w = 0$, where $\mu$ is a vector defining the market weightings. Assume that $\mu \notin \text{span}(D_1, \ldots, D_m)$. For example, for equal weightings, $\mu = (1, \ldots, 1)^T$.

The set M is an ellipsoid of dimension n−1. At interior points where $w^T V w < \sigma^2$, it has a normal $\gamma \mu$. At boundary points where $w^T V w = \sigma^2$, it has a one-parameter family of normals $B = \{\alpha V w + \beta \mu \geq 0, \beta \in R\}$. These are the only normals since the boundary of M has dimension n−2. The strict normals to M at w are those with $\alpha > 0$.

For w to be efficient, $B \cap \overline{Q} \neq 0$ must be true. That is, there must exist $\alpha \geq 0$ and $\beta$ not both zero and $x_1, \ldots x_m \geq 0$, not all zero, so that $$\alpha V w + \beta \mu = x_1 E_1 + \ldots + x_m E_m$$

Since $\mu \notin \text{span}(E_1, \ldots, E_m)$, then $\alpha > 0$, which is equivalent to $$V w = x_1 E_1 + \ldots + x_m E_m + y \mu$$

where y is determined so that $\mu^T w = 0$.

The set of efficient w can be explicitly parameterized by $$w = x_1 V^{-1} E_1 + \ldots + x_m V^{-1} E_m + y V^{-1} \mu$$

$$y = -\frac{x_1 \mu^T V^{-1} E_1 + \ldots + x_m \mu^T V^{-1} E_m}{\mu^T V^{-1} \mu}, \text{ or}$$

$$w = V^{-1} \sum_{j=1}^{m} x_j \overline{E_j}, \overline{E_j} = E_j - \frac{\mu^T V^{-1} E_j}{\mu^T V^{-1} \mu} \mu.$$

As $x_1, \ldots, x_m$ range through all nonnegative values, this sweeps out all efficient w, with suitable scaling to maintain $w^T V w = \sigma^2$. As with the previous case, this is a rather large efficient family.

Figure 2:
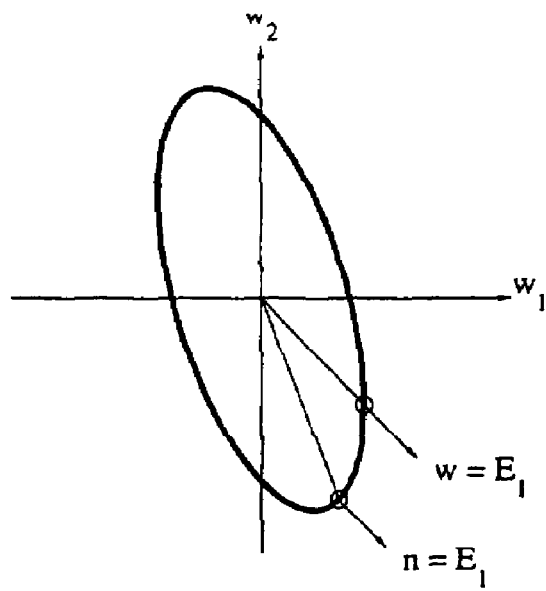
FIG. 2 depicts the optimal portfolios for two assets, according to an embodiment of the invention.

FIG. 2 depicts the optimal portfolios for two assets. The assets are labeled $w_1$ and $w_2$, and there will be a unique efficient point for a given belief, since there is only one vector $E_1$. The lower solution in this picture, $n=E_1$, is the unique efficient point with no constraint of market neutrality; the upper solution, $w=E_1$, is the market-neutral solution. The risk ellipsoid takes $\sigma_1 = 2\sigma_2$ and $\sigma = 0.5$.

4. Transaction Cost Limits

An important issue in practice is the transaction costs that will be incurred in moving from the current portfolio to another one that has been computed to be more optimal. If portfolios are regularly rebalanced, then the holding period for the new portfolio will be finite, and the costs of the transition must be directly balanced against the expected increase in rate of return.

One common way to formulate this trade off follows the formulation of volatility above: a rigid limit is imposed on the transaction costs that may be incurred in any proposed rebalancing, and efficient portfolios are sought within the set of new portfolios that can be reached from the starting portfolio without incurring unacceptable costs. In this formulation, one needs to incorporate transaction cost modeling.

Let $w^0$ be the current portfolio, and w be a candidate new portfolio. In order to rebalance $w^0$ to w, $w_i - w_i^0$ shares must be bought in the $i^{th}$ asset, for $i=1, \ldots n$; if this quantity is negative, then that number of shares must be sold.

One model for market impact costs asserts that the cost per share of a trade execution schedule is proportional to the $k^{th}$ power of the "rate of trading" measured in shares per unit time, where k is some positive exponent; $k=\frac{1}{2}$ is a typical value. Assuming that the program is always executed in a given fixed time, and recalling that the per-share cost is experienced on $w_i - w_i^0$ shares, the total cost of the rebalancing is $$F(w) = \sum_{i=1}^{n} \eta_i |w_i - w_i^0|^{k+1}$$

where $\eta_i$ is a stock-specific liquidity coefficient, neglecting "cross-impacts," where trading in stock i affects the price received on simultaneous trades in stock j.

If a total cost limit C is imposed, then the constraint set becomes $$M = M_0 \cap \{w \in R^n | F(w) \leq C\},$$

where $M_0$ is a preexisting constraint set that may take any of the forms describe above, such as total risk limit. Since $k > 0$, F is a convex function and hence its level sets are convex. Since $M_0$ is assumed convex, the intersection M is also a convex set, and the theorems above apply. Computing the efficient set is then a nontrivial problem in mathematical programming, though for the important special case $k=\frac{1}{2}$, methods of cone programming may be applied.

Figure 3:
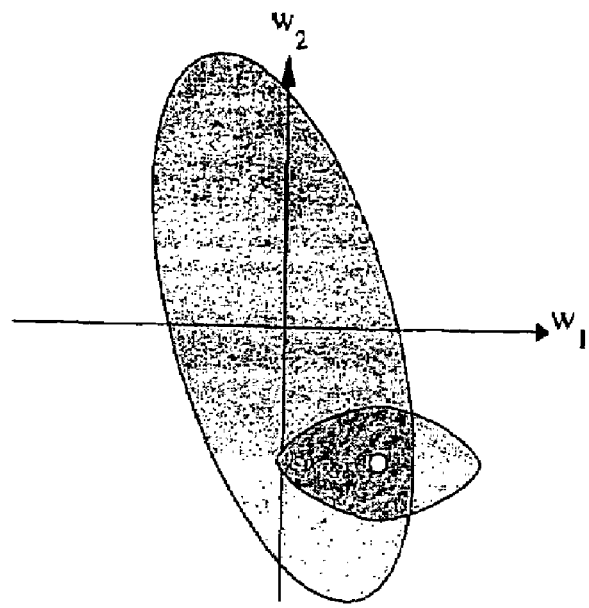
FIG. 3 depicts the geometry of a transaction cost limit in combination with risk limit, for two assets, according to an embodiment of the invention.

FIG. 3 depicts the geometry of a transaction cost limit in combination with risk limit, for two assets. The two assets are labeled $w_1$ and $w_2$. The ellipsoid represents the total risk limit, with $\sigma_1/\sigma_2 = 2$ and $\sigma = 0.5$. The curved diamond represents the new portfolios that are reachable from the given starting portfolio with a limit on total transition cost; $\eta_1/\eta_2 = 2.5$, and the exponent $k=\frac{1}{2}$. The dark shaded region is the set of new portfolios that satisfy both constraints. Note that the intersection does not have a smooth boundary although each individual set does; in the case shown here, efficient portfolios will most likely be at the bottom right corner of the dark region.

Optimal Portfolios

The set of efficient portfolios $\hat{M}$ defined according to one embodiment of the invention is large, and does not specify a unique optimal portfolio. In addition, portfolios within the efficient set $\hat{M}$ cannot be compared using the above definition of preference, and so there is no way to determine a single optimal portfolio. The relationship $\succeq$ is a partial ordering, as one cannot always say that either $w \succeq v$ or $v \succeq w$. In another embodiment of the invention, this definition can be extended to be a full ordering, so that for any two portfolios w, v, either $w \succeq v$ or $v \succeq w$, or possibly both.

In order to extend the definition of preference, consider two portfolio weight vectors w and v, along with their "relevant" parts $w_0$ and $v_0$ as previously defined. In general, unless $w \succeq v$ or $v \succeq w$, there will be some consistent return vectors for which $w_0$ gives a return superior to $v_0$, and a complementary set of return vectors for which $v^*$ gives a higher return. Only if $w \succeq v$ or $v \succeq w$ do all consistent return vectors give better results for one portfolio or the other.

For two candidate portfolio vectors w, v, define the cone $$Q_w = \{r \in Q | w_0^T r \geq v_0^T r\},$$

Note that, using the convention that R denotes the space of return vectors and W denotes the space of portfolio vectors, the inner product $w^T r = (w, r)$ defines a bilinear map $W \times R \rightarrow R$. The sets $Q_w$ and $Q_{-w}$ are complementary in the sense that $Q_w \cup Q_{-w} = Q$. Equivalently, in another embodiment of the invention, one could also use the cone $\overline{Q}_w = \{r \in \overline{Q} | w^T r \geq 0\}$. For two candidate portfolio vectors w, v consider the complementary sets $Q_{w_0 - v_0}$ and $Q_{v_0 - w_0}$: $Q_{w_0 - v_0}$ is the set of consistent return vectors for which the portfolio w will be at least as good as v, comparing only the relevant parts $w_0$, $v_0$.

The extended portfolio comparison relation can now be defined, according to an embodiment of the invention. For a probability density $\mu$ on R that satisfies $\mu(Q)=1$:

$w \succeq v$ (with respect to $\mu$) if and only if $\mu(Q_{w_0 - v_0}) \geq \mu(Q_{v_0 - w_0})$.

This definition includes and extends the previous one, which set $w \succeq v$ if $\mu(Q_{v_0 - w_0}) = 1$. In this embodiment, $w \approx v$ if the two sets of returns are of equal size, that is, if $\mu(Q_{w_0 - v_0}) = \mu(Q_{v_0 - w_0})$, and $w \succ v$ if $\mu(Q_{w_0 - v_0}) > \mu(Q_{v_0 - w_0})$. With this extended definition of preference, any pair of portfolios can be compared. Now for any w, v, either $w \succ v$, $w \approx v$, or $v \succ w$. Some specific choices for the density $\mu$ will be given below.

Figure 8:
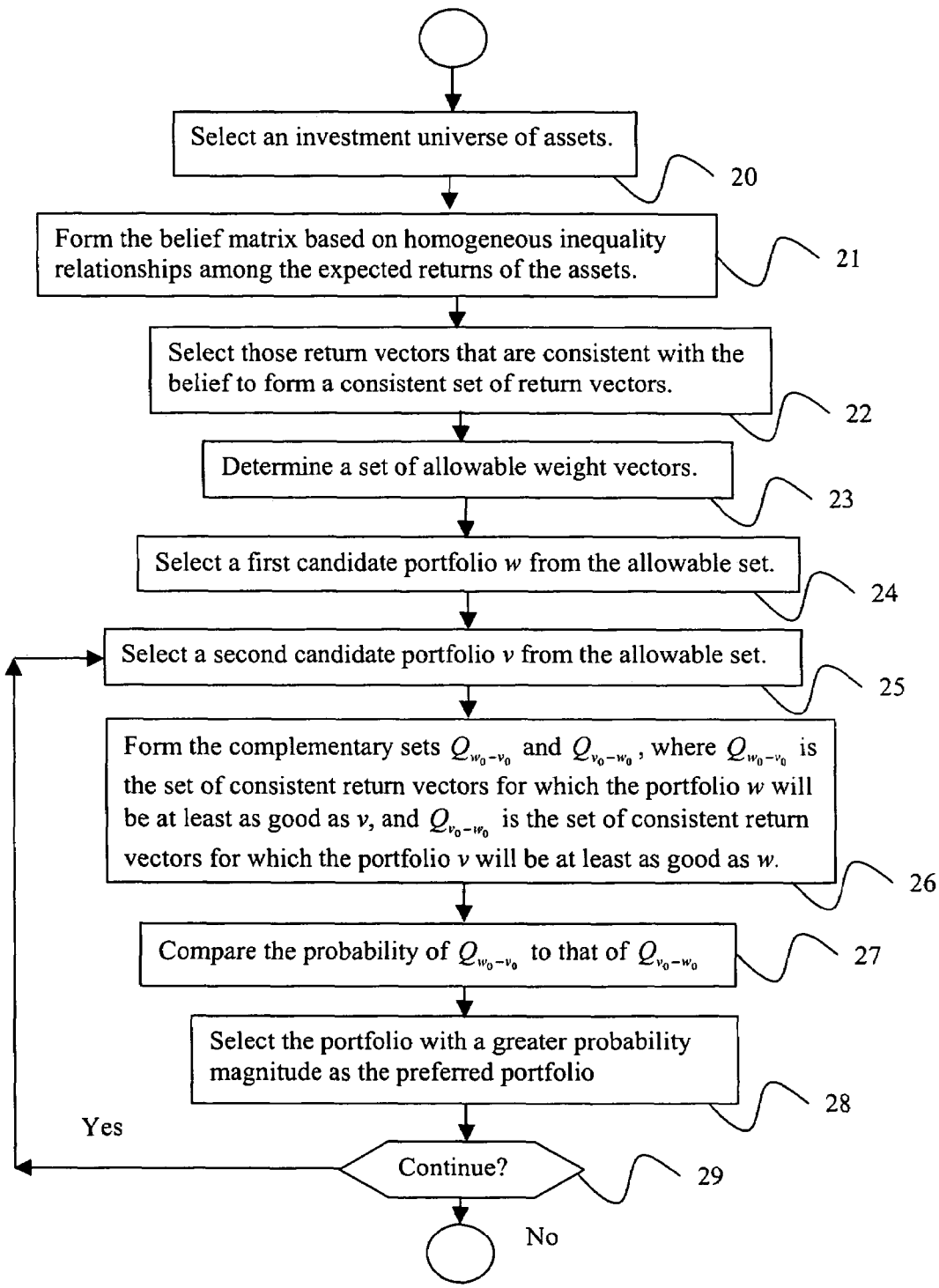
FIG. 8 presents a flow chart of a preferred method of comparing two portfolios according to an embodiment of the invention.

A preferred method of comparing two portfolios according to an embodiment of the invention is presented in the flow chart illustrated in FIG. 8. An investor is provided with an investment universe with a finite number of assets at step 20. At step 21, the investor forms a belief matrix based on one or more homogeneous inequality relationships among the expected returns of assets in the universe. These relationships can be an ordering that forms the basis of a sort of the expected returns of the assets. At step 22, the investor selects those return vectors that are consistent with the belief to form a consistent set Q of return vectors. At step 23, the investor determines a set M of allowable weight vectors, as determined by, for example, whether there are any constraints on the universe. These constraints include one or more of a total investment limit, a risk limit, a risk limit with market neutrality, a liquidity restriction, and a transaction cost limit. At step 24, the investor selects a first candidate portfolios v from the set M, and, at step 25, selects a second candidate portfolio w form the set M. At step 26 the investor forms the complementary sets $Q_{w_0 - v_0}$ and $Q_{v_0 - w_0}$, where $Q_{w_0 - v_0}$ is the set of consistent return vectors for which the portfolio w will be at least as good as v, comparing only the relevant parts $w_0$, $v_0$, and $Q_{v_0 - w_0}$ is the set of consistent return vectors for which the portfolio v will be at least as good as w, comparing only the relevant parts $w_0$, $v_0$ The investor then compares, at step 27, the probability of $Q_{w_0 - v_0}$ to that of $Q_{v_0 - w_0}$, and selects at step 28 the portfolio with a greater probability magnitude as the preferred portfolio. The investor can, at step 29, optionally return to step 25 to select another second portfolio to repeat the comparison.

Given this extended preference relation, if one can define a real-valued scalar function h(w) such that $w \succeq v$ if and only if $h(w) > h(v)$, then the single optimal portfolio can be found by maximizing this function.

According to an embodiment of the invention, a function that satisfies this criteria can be defined by $h(w) = c^T w$, where c is the centroid or center of mass of the consistent set Q under the probability measure $\mu$, defined by the integral $$c = \int_{r \in Q} r d\mu.$$

The centroid is in effect a mean of Q over $\mu$, and details of its calculation are provided below. If, according to an embodiment of the invention, it is assumed that the measure $\mu$ has mirror symmetry about the plane $\overline{Q}$, then $c \in \overline{Q}$, and for any $w \in W$, $w^T c = w_0^T c$ is true. Then, for any portfolios w, $v \in W$, and centroid vector c, the following holds:

$w \approx v \Leftrightarrow (w - v)^T c = 0.$

Thus, two portfolios are equivalently preferable if and only if $w^T c = v^T c$.

According to an embodiment of the invention, given a convex constraint set $M \subset W$, a vector $w \in M$ is efficient if and only if $(v - w)^T c \leq 0$ for all $v \in M$. In this embodiment, a candidate portfolio $w \in M$ is said to be centroid optimal if there are no portfolios $v \in M$ such that $v^T c > w^T c$. A centroid optimal portfolio w is a portfolio that maximizes the linear function $h(w) = c^T w$, defined above. If w is centroid optimal, then M has a supporting hyperplane at w whose normal is c as described above. The single optimal point is obtained by going as far as possible in the direction c. In order for w to be efficient, a further requirement is that $c \in \overline{Q} = Q \cap Q^*$.

Figure 9:
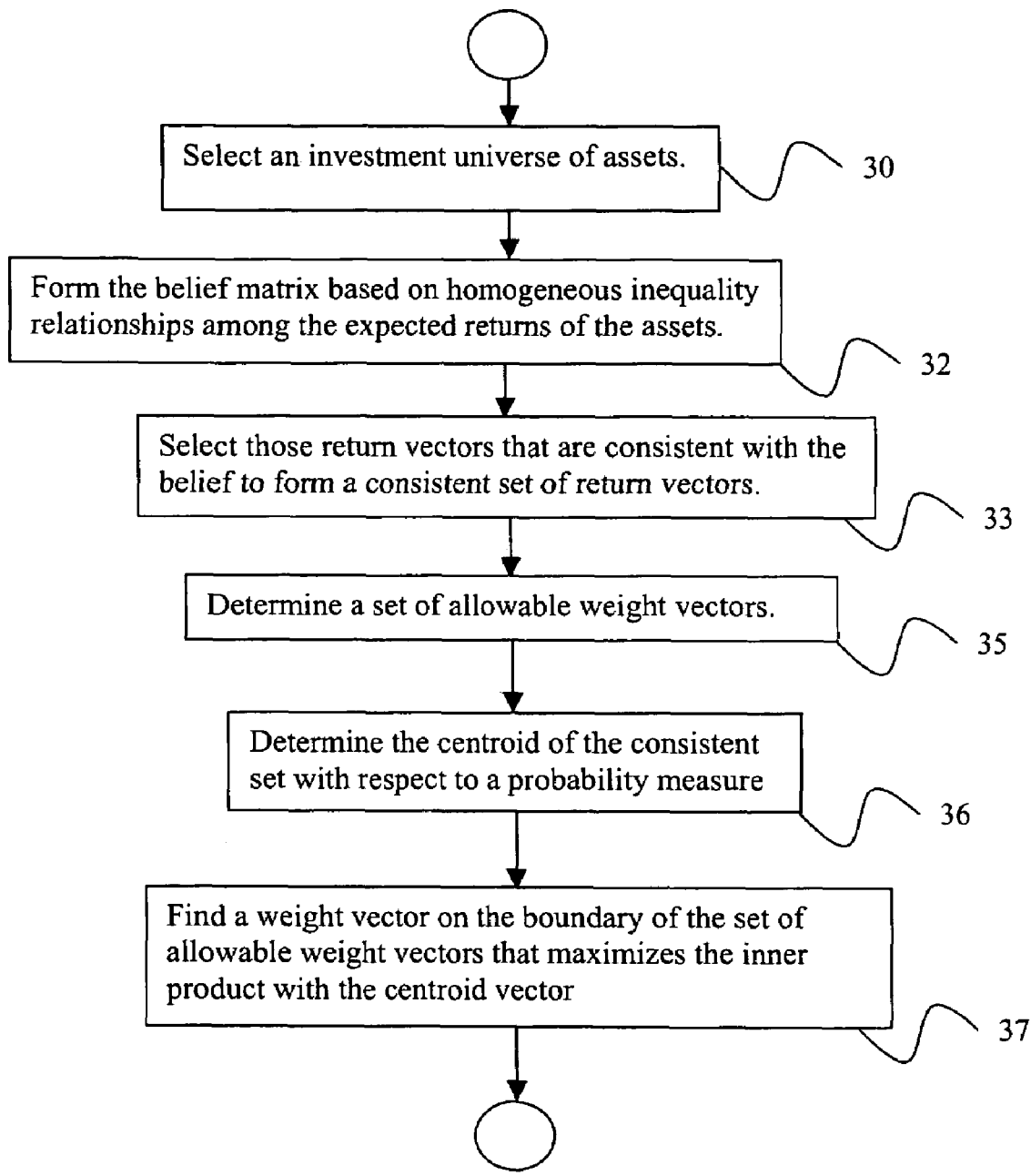
FIG. 9 presents a flow chart of a preferred method of determining an optimal portfolio by maximizing a function of the consistent set centroid, according to an embodiment of the present invention.

A preferred method of determining an optimal portfolio by maximizing a function of the consistent set centroid, according to an embodiment of the invention, is presented in the flow chart illustrated in FIG. 9. An investor is provided with an investment universe with a finite number of assets at step 30. At step 32, the investor forms a belief matrix based on one or more homogeneous inequality relationships among the expected returns of assets in the universe. These relationships can be an ordering that forms the basis of a sort of the expected returns of the assets. At step 33, the investor selects those return vectors that are consistent with the belief to form a consistent set Q of return vectors. The investor selects a set of allowable weight vectors M at step 35, as determined, for example, on constraints on the universe. These constraints include one or more of a total investment limit, a risk limit, a risk limit with market neutrality, a liquidity restriction, and a transaction cost limit. Then, the investor determines a centroid vector c of the consistent set with respect to a probability measure at step 36. The investor can now find, at step 37, the optimal portfolio w by finding a weight vector in the set of allowable weight vectors that maximizes the inner product $c^T w$ with the centroid vector c. The optimal weight vector will preferably be on the boundary of the allowable set.

Figure 10:
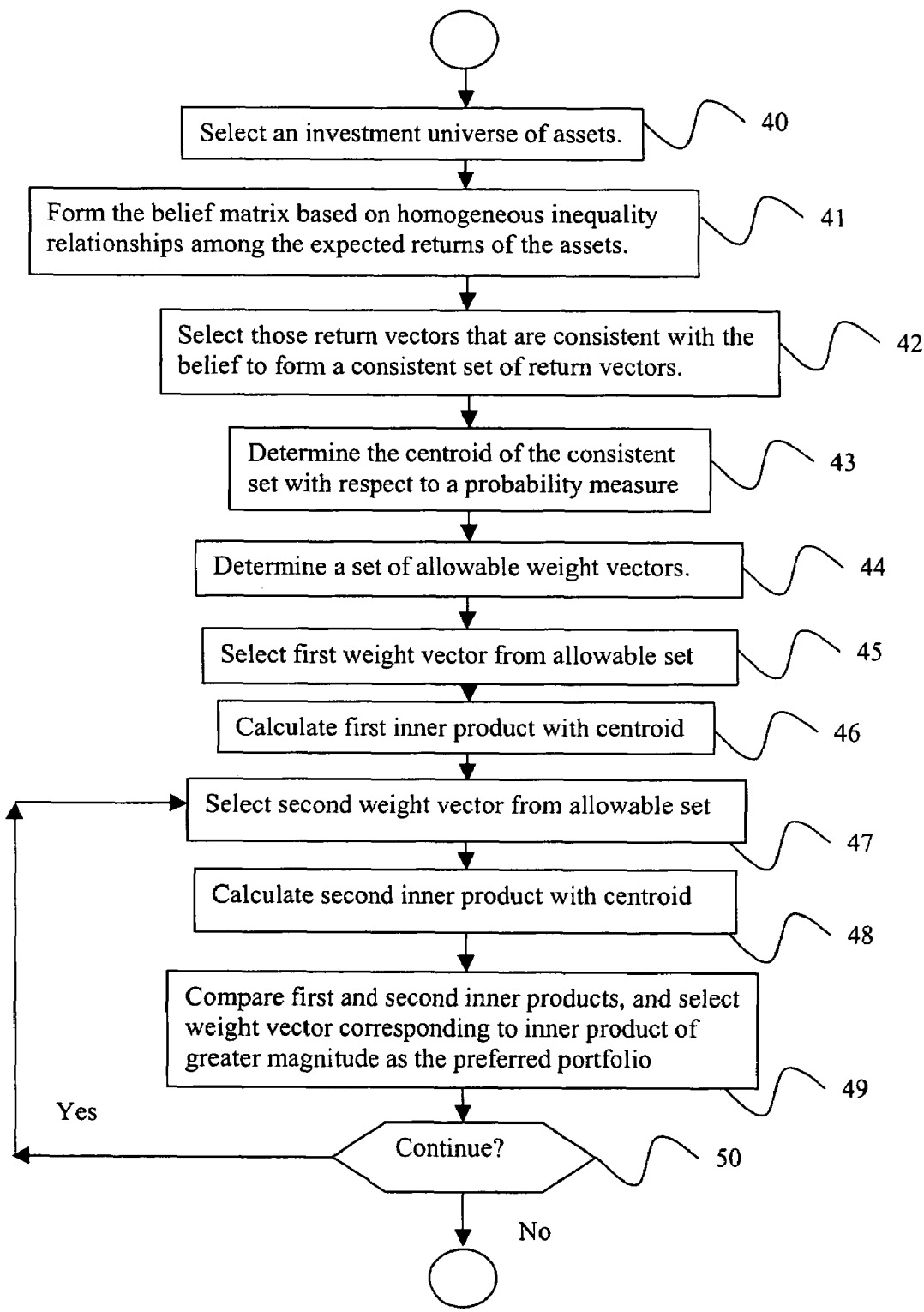
FIG. 10 presents a flow chart of a preferred method of determining an optimal portfolio by comparison of the inner product with the consistent set centroid, according to an embodiment of the present invention.

A preferred method of determining an optimal portfolio by comparison of the inner product with the consistent set centroid, according to an embodiment of the invention, is presented in the flow chart illustrated in FIG. 10. An investor is provided with an investment universe with a finite number of assets at step 40. At step 41, the investor forms a belief matrix based on one or more homogeneous inequality relationships among the expected returns of assets in the universe. These relationships can be an ordering that forms the basis of a sort of the expected returns of the assets. At step 42, the investor selects those return vectors that are consistent with the belief to form a consistent set Q of return vectors, and calculates its centroid c at step 43. The investor selects a set of allowable weight vectors M at step 44, as determined, for example, on constraints on the universe. These constraints include one or more of a total investment limit, a risk limit, a risk limit with market neutrality, a liquidity restriction, and a transaction cost limit. Then, at step 45, the investor selects a first weight vector w from the allowable set M, and calculates a first inner product with the centroid c at step 46. At step 47, the investor selects a second weight vector v and calculates a second inner product at step 48. At step 49, the first inner product and the second inner product are compared, and the weight vector corresponding the inner product of greater magnitude is selected by the investor as the preferred portfolio. At step 50, the investor can optionally continue this process by returning to step 47 to select another, second weight vector to perform another comparison, wherein the preferred portfolio from step 49 is now the first weight vector.

As in classical portfolio theory, the magnitude of the centroid vector c according to an embodiment of the invention has no effect on the resulting optimal portfolio, given constraints on the portfolio. The centroid vector is defined only up to a scalar factor, and can be thought of as a ray through the origin rather than a single point. The centroid vector is not itself the optimal portfolio, but rather an effective vector of expected returns, and the methods disclosed herein can be considered a formula or algorithm for constructing this vector from the ordering information. Thus, according to an embodiment of the invention, if one has a formula for the centroid, then the problem of finding an efficient portfolio can be transformed into a linear optimization problem subject to a constraint, for which solutions are well known.

An exemplary common budget constraint is a pure risk constraint, that is, a constraint wherein the total variance of a portfolio w is less than a fixed amount $\sigma^2$. This is a constraint for which $$M = \{w \in W | w^T V w \leq \sigma^2\},$$

where V is the covariance matrix. In this case, the resulting optimal portfolio is $w = V^{-1} c$, scaled by a constant to attain the prescribed risk level. If the portfolio constraints are of more complicated form involving, for example, position limits, short sales constraints, or liquidity costs relative to an initial portfolio, then all the standard machinery of constrained optimization may be brought to bear in the situation. Constraints on the portfolio weights are "orthogonal" to the inequality structure on the expected returns.

Thus, centroid optimal portfolios in the case of a complete sort are equivalent to portfolios constructed by creating a set of expected returns from the inverse image of the cumulative normal function, where the top ranked stock receives the highest alpha, and the alphas have the same order as the stocks themselves. So, the centroid optimal portfolio is the same portfolio as the Markowitz optimal portfolio corresponding to a set of expected returns that are normally distributed in the order of the corresponding stocks.

Probability Measure

A suitable probability measure according to an embodiment of the present invention needs to satisfy the condition that there is no information about the expected return vector other than the inequality beliefs that define the consistent set. The most neutral choice is to choose a probability density that is radially symmetric about the origin, restricted to the consistent cone Q. A radially symmetric density is one that is invariant under Euclidean rotations in return space: $r \rightarrow Sr$, where S is an orthogonal matrix. A radially symmetric density can be written in the form $\mu(r) = h(|r|) g(r/|r|)$ where $h(\rho)$ for $\rho = |r| \geq 0$ contains the radial structure and $g(\omega)$ with $|\omega| = 1$ contains the azimuthal structure. It is required that $g(\omega)$ be a constant density, at least in the segment of the unit sphere included in the wedge Q. The radial function $h(\rho)$ may have any form, as long as it decreases sufficiently rapidly as $\rho \rightarrow \infty$ so that the total measure is finite. For example, according to an embodiment of the invention, one possible distribution is the n-component uncorrelated normal distribution, with density proportional to $h(\rho) = C \rho^{n-1} \exp(-\rho^2/2R^2)$, where the proportionality constant C is a normalizing constant so that the total probability measure is equal to one. According to another embodiment of the invention, another possibility is a distribution uniform on the sphere of radius R. In both of these cases, R is a typical scale of return magnitude, for example 5% per year, and can have any value.

One feature of this probability measure is that there is no need to specify the value of R or even the structure of the distribution: the relative classification of returns is identical under any radially symmetric density. Since all the sets of interest are cones, their size can be measured by their angular measure.

Examples of Sorts

The following examples illustrate methods according to an embodiment of the present invention for determining centroid portfolios for a non-limiting, exemplary set of inequality criteria. In addition, computer simulations and empirical tests run against a database of actual daily stock prices demonstrate performance of portfolios formed by the methods of the present invention versus portfolios formed by pre-existing, ad hoc methods.

Figure 4:
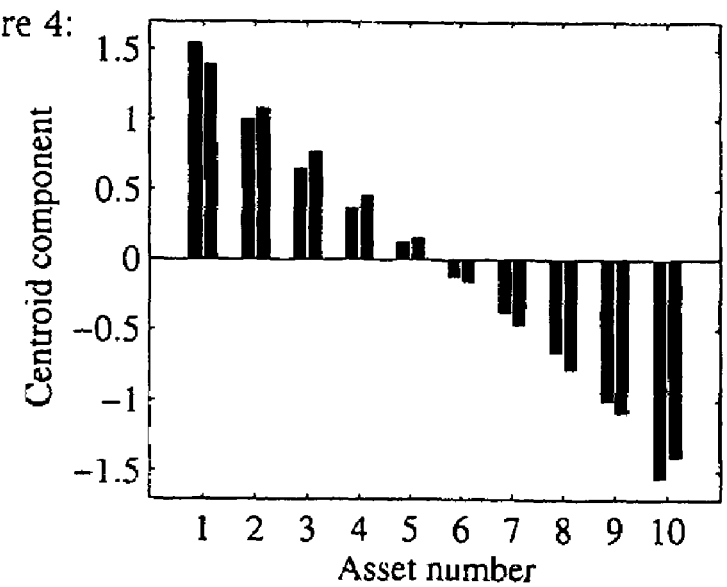
FIG. 4 depicts a centroid vector for a single sector of 10 assets, compared with a linear portfolio, according to an embodiment of the invention.

1. Complete Sort: FIG. 4 depicts a centroid vector for a single sector of 10 assets, compared with a linear portfolio. These vectors are defined only up to a scalar constant; for the plot they have been scaled to have the same sum of squares. The centroid weightings are the left bar within each group, the linear are the right; the relative magnitudes of the two profiles have been arbitrarily determined. A linear weighing can be defined as, for a single sorted list of n assets, $$b_i = \sum_{j=1}^{n-1} E_{ij} = \frac{n+1}{2} - i.$$

A linear portfolio assigns equal weight to each difference component. By comparison, the centroid portfolio curves up at the ends, assigning greater weight to the differences at the ends or the portfolio than the differences in the middle of the portfolio. The reason for this is that typical distributions have long "tails", so two neighboring samples near the endpoints are likely to be more different from each other than two samples near the middle.

2. Sector Sorts: As a next example, consider the case where it is assumes that each stock is assigned to a distinct sector and that within each sector there is a complete sort. If there are k sectors with $m_i$ stocks in sector i then the stocks can be ordered as follows:

$$(r_1, r_2, \ldots, r_{n_1}), (r_{n_1+1}, \ldots, r_{n_2}), \ldots, (r_{n_{k-1}+1}, \ldots r_n)$$

with $n_1 = m_1$, $n_2 = m_1 + m_2$, ..., $n_k = m_1 + \ldots + m_k = n$. Then assume a sort within each group:

$$r_1 \geq \ldots \geq r_{n_1}, r_{n_1+1} \geq \ldots \geq r_{n_2}, \ldots, r_{n_{k-1}+1} \geq \ldots \geq r_n.$$

This is almost as much information as in the complete sort case except that there is no information about the relationships at the sector transitions. If there are k sectors, there are $m = n-k$ columns Dj of the form $(0, \ldots, 0, 1, -1, 0, \ldots, 0)^T$, and the matrix D is of size $(n-k) \times n$. The consistent cone Q is a Cartesian product of the sector cones of dimension $m_1, \ldots, m_k$.

As a specific example, if there are five assets, divided into two sectors of length two and three, then $$D = \begin{pmatrix} 1 & -1 & & & \\ & & 1 & -1 & \\ & & & 1 & -1 \end{pmatrix}$$

For k sectors, there are k orthogonal directions, corresponding to the mean expected returns within each sector. $Q^\perp$ has dimension k, and $Q^\parallel$ has dimension n–k.

Figure 6:
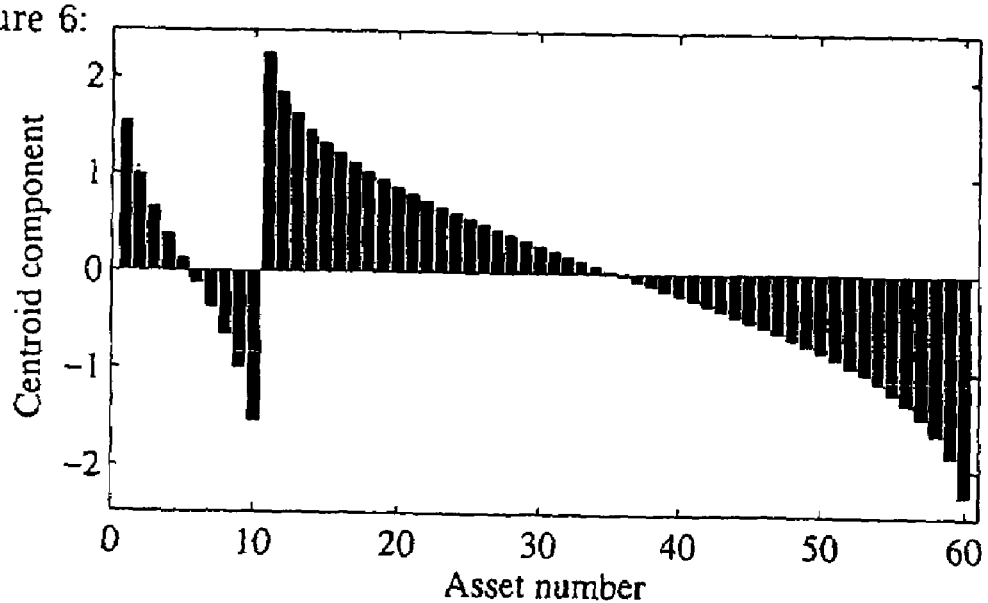
FIG. 6 shows the centroid portfolio for two sectors, according to an embodiment of the invention.

FIG. 6 shows the centroid portfolio for two sectors. One sector has 10 assets and the other has 50 assets, for a total portfolio size of n=60. Within each sector, the vector is a scaled version of the centroid vector for a single sector. Although the overall scaling of the graph is arbitrary, the relative scaling between the two sectors is fixed by the construction and is consistent with intuition. It assigns larger weight to the extreme elements of the larger sector than to the extreme elements of the smaller sector. This is natural because in this example the first element of the sector with 50 elements dominates 49 other components, whereas the first element of the sector with 10 elements dominates only 9 other assets.

3. Complete Sort with long-short beliefs: As a modification of the above case, consider that the stocks are divided into two groups: a "long" group that will go up, and a "short" group that will go down. Within each group there is additional ranking information. If l is the number of long stocks, then these beliefs may be expressed as $r_1 \geq \ldots \geq r_l \geq 0 \geq r_{l+1} \geq \ldots \geq r_n$, which is a total of m=n beliefs. This includes the special cases l=n when all assets will have positive return, and l=0 when all will have negative return.

To illustrate, consider five assets, with the first two believed to have positive return, the last three to have negative. Then n=5, l=2, and $$D = \begin{pmatrix} 1 & -1 & & & \\ & 1 & & & \\ & & -1 & & \\ & & 1 & -1 & \\ & & & 1 & -1 \end{pmatrix}.$$

For a complete sort with long-short classification, there are no orthogonal directions since m=n. Every component of the return vector is relevant to the forecast. Hence, $Q^\perp=\{0\}$, and $Q^\parallel=R^n$.

Figure 5:
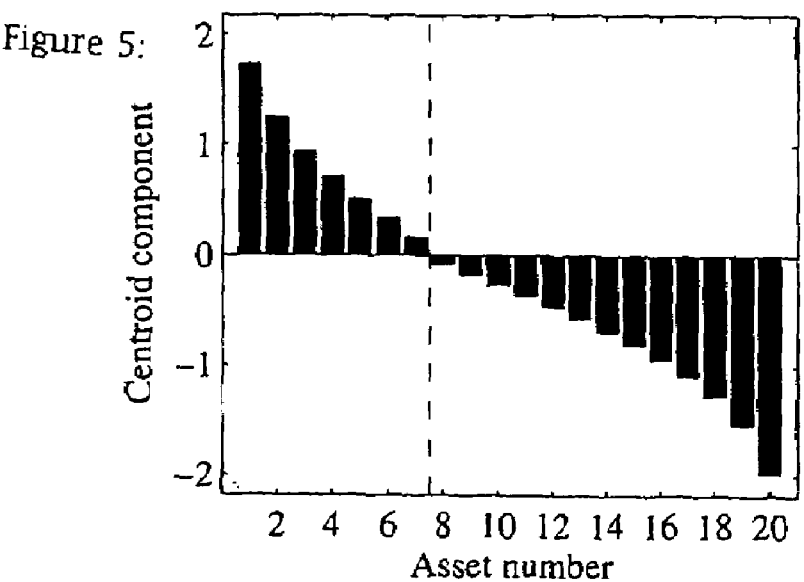
FIG. 5 depicts a centroid vector for a single sector of 20 assets, with the belief that the first 7 will have positive return while the last 13 will have negative return, according to an embodiment of the invention.

FIG. 5 depicts a centroid vector for a single sector of 20 assets, with the belief that the first 7 will have positive return while the last 13 will have negative return. These are long/short constraints for the case n=20 and l=7. This vector is not a simple linear transformation of the centroid vector without the zero constraint; its shape is more complicated.

4. Performance relative to index: As another example, consider performance relative to index. Define an index to be a linear weighting of the assets:

$I = \mu_1 S_1 + \ldots + \mu_n S_n$, with $\mu_j \geq 0$ and $\mu_1 + \ldots + \mu_n = 1$. Assume that the first $l_1$ stocks will overperform the index, and the next $l_2$ will underperform, with $l_1 + l_2 \leq n$. Thus the beliefs are $r_j - (\mu_1 r_1 + \ldots + \mu_n r_n) \geq 0, j=1, \ldots, l_1$ $(\mu_1 r_1 + \ldots + \mu_n r_n) - r_j \geq 0, j=l_1 1, \ldots, l_1 + l_2$.

The belief matrix is:

$$D = \begin{pmatrix} 1-\mu_1 & \cdots & -\mu_l & -\mu_{l+1} & \cdots & -\mu_n \\ \vdots & \ddots & \vdots & \vdots & & \vdots \\ -\mu_1 & \cdots & 1-\mu_l & -\mu_{l+1} & \cdots & -\mu_n \\ \mu_1 & \cdots & \mu_l & \mu_{l+1}-1 & \cdots & \mu_n \\ \vdots & & \vdots & \vdots & \ddots & \vdots \\ \mu_1 & \cdots & \mu_l & \mu_{l+1} & \cdots & \mu_n-1 \end{pmatrix}.$$

Each of the belief vectors is orthogonal to (1, ..., 1), and therefore the belief vectors are in an (n−1)-dimensional subspace, and cannot be independent. However, the cone Q={Dr≧0} has a non-empty interior {Dr>0}, and contains the vector r=(1, ..., 1, −1, ..., −1)$^T$ for which $$(Dr)_i = \begin{cases} 2(\mu_{l+1} + \cdots + \mu_n), i=1, \ldots, l, \\ 2(\mu_1 + \cdots + \mu_l), i=l+1, \ldots, n \end{cases}.$$

Thus, the methods according to the present invention previously disclosed can be used.

Partial Sorts, Multiple Sorts, and Missing Information

In another embodiment of the present invention, centroid methods can be applied for producing optimal portfolios from partial sorts, that is, from sorts that do not extend across an entire universe of stocks. The most natural way this arises in practice is in the case of a universe of stocks broken up into sectors. In this case a portfolio manager might have sorting criteria appropriate for stocks within a sector but which do not necessarily work for stocks across sectors.

In another embodiment of the invention, the method disclosed herein can be applied to multiple sorting criteria. For example one might sort stocks according their book-to-market ratio and size, for example, the logarithm of market capitalization. These characteristics provide two different sorts, but the resulting sorts are different and hence it is impossible that they both be true. Nevertheless, both contain useful information that it would be suboptimal to discard. Centroid portfolio optimizations methods are still valid in this case. Let $Q_1$ and $Q_2$ be the consistent cones under the two different criteria (e.g., $Q_1$ is the consistent cone for the book-to-market sort, and $Q_2$ is the consistent cone for the size sort). Then, define a density on the union of $Q_1$ and $Q_2$ that assigns a probability p of finding an expected return in $Q_1$ and 1−p in $Q_2$. The centroid of the combined set under this measure is simply the weighted average of the two individual centroids. Using only the inequality information given by the sorts for $Q_1$ and $Q_2$ that have been specified, this is the only natural construction.

In another embodiment of the present invention, where there are more than two nonoverlapping weightings, one can take the centroid of the combined set, which is an equal-weighted combination of the individual centroids. As an example, suppose that three orderings are given, and that two are close to each other. Then this algorithm will produce a centroid close to the centroids of the two close orderings.

In another embodiment of the invention, the previous procedure indicates how to proceed when some information is considered unreliable. Suppose, for example, that it is believed that in the middle one-third of the asset list, the rankings have no significance. That is, the investor's beliefs are that all rankings within that subset are equally probable. The extension of the above strategy says to simply compute the superposition of the centroids of all the compatible orderings. The result of this is simply to average the centroid components within the uncertain index range.

Calculating the Centroid

Provided herein below are exemplary, non-limiting examples of centroid calculations. However, any method of calculating the integral $c = \int_{\epsilon Q} r d\mu$ is within the scope of the invention.

1. Monte Carlo: The simplest way to calculate c is by Monte Carlo. Let x be a sample from an n-dimensional uncorrelated Gaussian, and for the single-sector case, let y be the vector whose components are the components of x sorted into decreasing order. Then y∈Q, and since the sorting operation consists only of interchanges of components which are equivalent to planar reflections, the density of y is a radially symmetric Gaussian restricted to Q. The estimate of c is then the sample average of many independent draws of y.

The multiple-sector case is handled simply by sorting only within each sector. Note that this automatically determines the relative weights between the sectors.

The case with comparison to zero is also easily handled. The initial Gaussian vector is sign corrected so that its first l components are nonnegative and its last n−l components are nonpositive; then a sort is performed within each section. Clearly, each of these operations preserves measure.

For more complicated inequality information structures, the geometry is not always so simple; it is not always possible to reduce a general point x into the wedge Q by measure-preserving reflections. Each new situation must be evaluated on its own.

2. Direct Calculation: For a single sort, computing a centroid is a special case of the general problem of order statistics. Define x to be an n-vector of independent samples from a distribution with density f(x) and cumulative distribution F(x). Assume that this density is a Gaussian so that the density of x is spherically symmetric. Define y to be a vector comprising the components of x sorted into decreasing order. Then, the density of the jth component $y_{j,n}$ is $$\text{Prob}\{w < y_{j,n} < w + dw\} = \frac{n!}{(j-1)!(n-j)!} F(w)^{n-j}(1-F(w))^{j-1} f(w) dw$$

The centroid component $c_{j,n}$ is the mean of this distribution:

$$c_{j,n} = \frac{n!}{(j-1)!(n-j)!} \int_{-\infty}^{\infty} w F(w)^{n-j}(1-F(w))^{j-1} f(w) dw$$

$$= \frac{n!}{(j-1)!(n-j)!} \int_0^1 F^{-1}(z) z^{n-j}(1-z)^{j-1} dz = E_g(F^{-1}(z)),$$

where $E_g(\ )$ denotes the expectation under the probability distribution $$g(z) = \frac{n!}{(j-1)!(n-j)!} z^{n-j}(1-z)^{j-1}.$$

When j and n are large, this distribution is narrow. Thus, reasonable approximations to the integral are either $F^{-1}$ ($z_{mean}$) or $F^{-1}(z_{max})$, where the mean and peak of the distribution are $$z_{mean} = \frac{n-j+1}{n+1}, \text{ and } z_{max} = \frac{n-j}{n-1}.$$

Note that the maximum value has the disadvantage that it requires that $F^{-1}(z)$ at z=0, 1, which is not defined.

For the normal distribution, these formulae are special cases, with α=0, 1, of the Blom approximation:

$$c_{j,n} \approx F^{-1}\left(\frac{n+1-j-\alpha}{n-2\alpha+1}\right),$$

where α can take on values from about 0 to about 1. Comparison with numerical integrations of the above exact expression for $c_{j,n}$ indicate that another approximation can be obtained using α=A−Bj<sup>−β</sup>. According to one embodiment of the invention, A equals about 0.4424, B equals about 0.1185, and β equals about 0.21. This provides centroid components with maximal fractional error less than one-half percent when n is small, decreasing as n increases. Note that these values of A, B, and A are approximate, and can vary depending upon the value of j, how they are calculated, the type of computer used for the calculation, how good the approximation needs to be, etc. Since c is defined only up to a scalar factor, the errors in the normalized coefficients will be smaller.

For multiple sector sorts, the above procedures can be applied to each sector. Because normalization has been preserved, the relative magnitudes will be correct.

System Implementations

It is to be understood that the present invention can be implemented in various forms of hardware, software, firmware, special purpose processes, or a combination thereof. In one embodiment, the present invention can be implemented in software as an application program tangible embodied on a computer readable program storage device. In one embodiment of the invention, this computer readable program storage device could be made available to investors wishing to use the methods of the invention. The application program may be uploaded to, and executed by, a machine comprising any suitable architecture.

Figure 11:
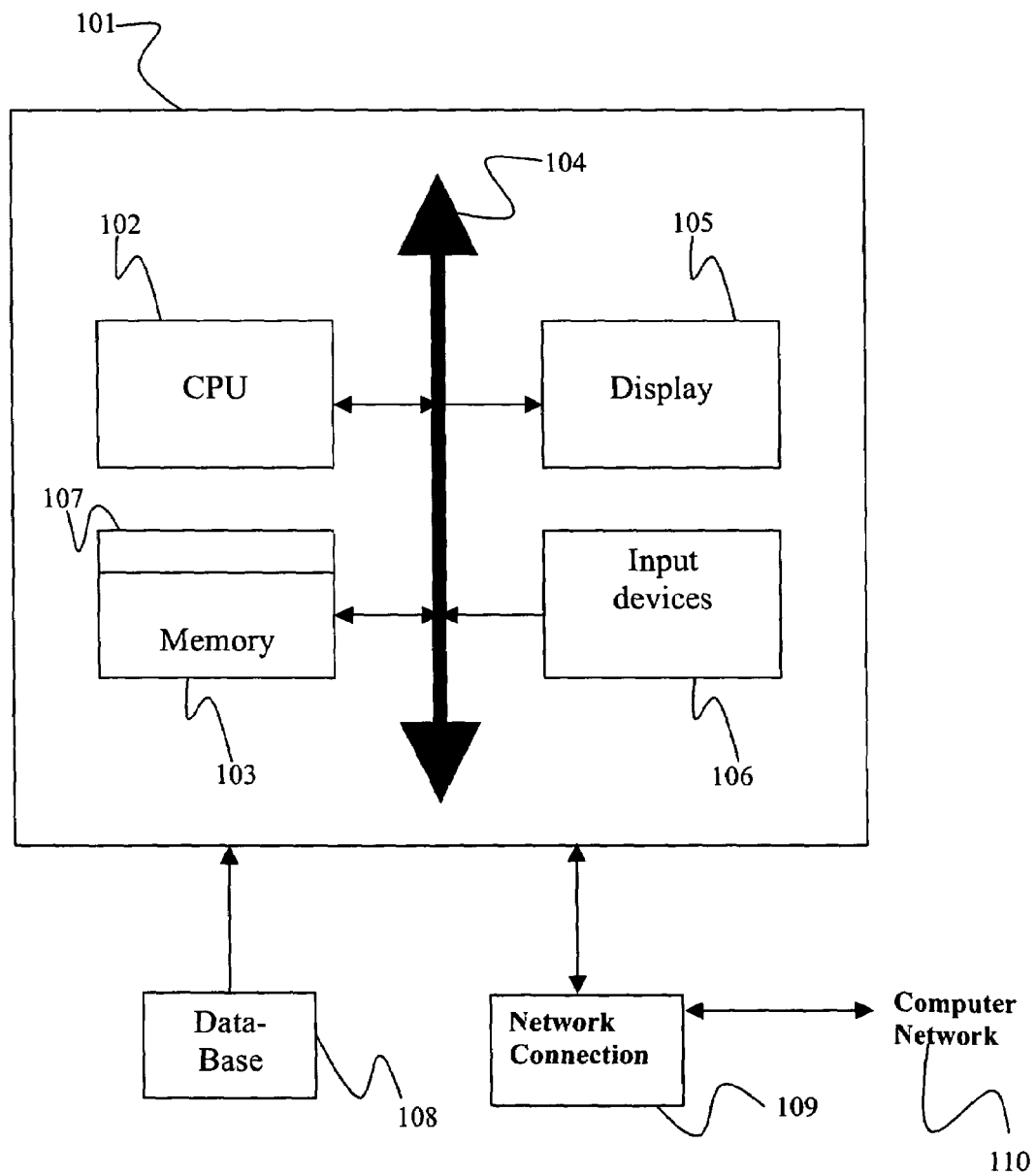
FIG. 11 presents a schematic block diagram of a system that can implement the methods of the invention.

Preferably, the present invention is implemented as a combination of both hardware and software, the software being an application program tangibly embodied on a program storage device. Referring now to FIG. 11, preferably, the machine is implemented on a computer platform 101 having hardware such as one or more central processing units (CPU) 102, a random access memory (RAM) 103, and input/output (I/O) interface(s) 106. The computer system can also include a network connection 109 to a computer network 110. The network can be a local network, a global network, such as a network utilizing the Internet Protocol, or a local network that is in turn connected to a global network. One or more databases 108, as needed by the methods of the invention for defining asset universes and their histories, can be stored as part of the computer system, or can be stored, along with the software routine, as part of any other computer system connected to computer system via the network connection 109. The present invention can be implemented as a routine 107 that is stored in memory 103 and executed by the CPU 102, and can process data from database 108 and signals from network connection 109. As such, the computer system 101 is a general purpose computer system that becomes a specific purpose computer system when executing the routine 107 of the present invention. The computer platform 101 also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

The computer system can be accessible to external users over a computer network, either global or local. Similarly, the methods of the invention can be available to an investor over a computer network. An investor, using a computer connected to a computer network such as the World Wide Web, can access a website running on a server in which software implementing a preferred portfolio optimization method of the invention is resident. The web server that runs the portfolio optimization software can be connected to one or more financial databases as needed. An investor can use the resident software over the website to build an optimal portfolio from an investment universe provided by the investor, or the investor can use the resident software to both select the investment universe and build an optimal portfolio form that universe. In one variation, the portfolio optimization software routine is usable by any investor visiting the website in which it is resident. In another variation, an investor would first need to register with the website in order to set up an account with the website. The investor would then need to log into the website with his or her user name and password before being able to use the portfolio optimization software to build an optimal portfolio. The website could, for example, present questions and provide data entry fields that would allow the investor to specify an investment universe, constraints on the portfolio such as risk limit, total investment limit, liquidity restrictions, or transaction cost limits, and beliefs regarding the expected returns in the form of homogeneous inequality relationships. The website would output an optimal portfolio, i.e. a set of weights for the selected set of investments, to the investor. In another variation, the software system implementing the methods of the invention can be distributed across one or more computing systems or servers accessible via a website and one or more subprograms of the system can be downloaded for execution on the investors client system.

It is to be further understood that since the exemplary systems and methods described herein can be implemented in software, the actual method steps may differ depending upon the manner in which the present invention is programmed. Given the teachings herein, one of ordinary skill in the related art will be able to contemplate these and similar implementations or configurations of the present invention. Indeed, while the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A program storage device readable by a computer having a processor and a memory, tangibly embodying a program of instructions which when executed by the processor causes the processor to perform a method for optimizing a portfolio of a finite number n of assets, said method comprising the steps of:

storing in the memory of the computer a belief matrix D from one or more relationships between the expected returns $r=r_1, r_2, r_3 \ldots r_n$ of the assets;

generating by the computer processor of the computer asset returns that are consistent with the belief matrix D to form a consistent set Q of return vectors;

generating by the computer processor of the computer a centroid vector c of the consistent set Q of return vectors with respect to a probability measure h; and determining by the computer processor of the computer an optimal portfolio by finding a weight vector $w=(w_1, w_2, w_3 \ldots w_n)$ that maximizes a vector relationship with the centroid vector c, wherein the one or more relationships are one or more linear homogeneous inequalities between the expected returns r of the form $$D_{i1}r_1 + D_{i2}r_2 + \ldots + D_{in}r_n \geq 0,$$

where $D_{ij}$ are entries of the belief matrix D, where $1 \leq i \leq M$ and $1 \leq j \leq N$, and M and N are finite, natural numbers, the consistent set Q of return vectors is given by $$Q = \{r \in R^N | Dr \geq 0\},$$

the centroid vector c is given by $$c = \int_{r \in Q} r \, dh,$$

and the vector relationship between the weight vector w and the centroid vector c is an inner product, $$w \cdot c.$$

2. The computer readable program storage device of claim 1, wherein the set of allowable weight vectors is determined based on one or more constraints.

3. The computer readable program storage device of claim 2, wherein said constraints include a risk limit, a total investment limit, a liquidity restriction, a risk constraint with market neutrality, or a transaction cost limit.

4. The computer readable program storage device of claim 1, wherein the probability measure h is spherically symmetric and centered at the origin and decreases sufficiently rapidly with increasing radius wherein a total probability determined by an integration of the probability measure h over all space is finite.

5. The computer readable program storage device of claim 4, wherein the probability measure h is defined by $$h(\rho) = C\rho^{n-1}\exp(-\rho^2/2R^2),$$

where $\rho$ is a magnitude in the set of return vectors, n is the dimensionality of the vectors, R is a scale magnitude, and C is a normalization constant chosen so that the total probability function is equal to one.

6. The computer readable program storage device of claim 4, wherein the probability measure h is a distribution uniform on a sphere of radius R.

7. The computer readable program storage device of claim 1, wherein the one or more linear homogeneous inequality relationships comprise an ordering of some or all of the expected returns.

8. The computer readable program storage device of claim 1, wherein the one or more linear homogeneous inequalities is a plurality of linear homogeneous inequalities between the expected returns, the consistent set is formed from the plurality of orderings, and the centroid vector c is determined under a probability measure that gives equal weight to each return vector in the consistent set.

9. The computer readable program storage device of claim 1, wherein the asset returns are divided into sectors, the asset returns within each sector are interrelated according to a subset of the linear homogeneous inequalities, and the asset returns in different sectors are not interrelated by the linear homogeneous inequalities.

10. The computer readable program storage device of claim 9, wherein the linear homogeneous inequalities do not include information regarding assets in a sector, the method further comprises the step of computing a superposition of centroids of the remaining sectors of assets for which the linear homogeneous inequalities interrelate the expected returns, and averaging the centroid components within the sector where the ordering is not utilized.

11. The computer readable program storage device of claim 1, wherein the step of determining the centroid vector c comprises a Monte Carlo computation.

12. The computer readable program storage device of claim 9, wherein the centroid vector c is calculated by performing a Monte Carlo calculation in each sector, and forming a superposition of the centroids of each sector.

13. The computer readable program storage device of claim 1, wherein the step of determining the centroid vector c comprises calculating the expression $$c_{j,n} = \frac{n!}{(j-1)!(n-j)!} \int_{-\infty}^{\infty} wF(w)^{n-j}(1-F(w))^{j-1}f(w)dw$$
$$= \frac{n!}{(j-1)!(n-j)!} \int_{0}^{1} F^{-1}(z)z^{n-j}(1-z)^{j-1}dz,$$

wherein $c_{j,n}$ is the jth component of an n-dimensional centroid vector, f(w) is the probability density, and F(w) is a cumulative distribution of f(w), and w is defined by $$Prob\left\{\begin{matrix}w < y_{j,n} < \\ w+dw\end{matrix}\right\} = \frac{n!}{(j-1)!(n-j)!}F(w)^{n-j}(1-F(w))^{j-1}f(w)dw,$$

wherein $y_{j,n}$ is a jth component of a vector comprising the asset universe sorted into decreasing order.

14. The computer readable program storage device of claim 13, wherein the integration to provide the centroid vector c is approximated by $F^{-1}(z_{mean})$, wherein $$z_{mean} = \frac{n-j+1}{n+1}.$$

15. The computer readable program storage device of claim 13, wherein the probability distribution is a normal distribution, the integration to provide the centroid vector c is approximated by the Blom approximation $$c_{j,n} \approx F^{-1}\left(\frac{n+1-j-\alpha}{n-2\alpha+1}\right),$$

wherein $\alpha$ is a parameter in the range from about 0 to about 1.

16. The computer readable program storage device of claim 15, wherein $\alpha$ is defined by the formula $\alpha=A-Bj^{-\beta}$, wherein A, B, and $\beta$ are determined by comparing the Blom approximation to a numerical integration of the expression for $c_{j,n}$.

17. The computer readable program storage device of claim 15, wherein $\alpha$ is defined by the formula $\alpha=A-Bj^{-\beta}$, wherein A is about 0.4424, B is about 0.1185, and $\beta$ is about 0.21.

18. A method for implementation by a computer having a processor and a memory for optimizing a portfolio of a finite number n of assets in an investment universe, said method comprising the steps of:

storing in the memory of the computer a belief matrix D from one or more relationships between the expected returns $r=r_1, r_2, r_3 \ldots r_n$ of the assets;

generating by the computer processor of the computer asset returns that are consistent with the belief matrix D to form a consistent set Q of return vectors;

generating by the computer processor of the computer a centroid vector c of the consistent set Q of return vectors with respect to a probability measure h; and determining by the computer processor of the computer an optimal portfolio by finding a weight vector $w=(w_1, w_2, w_3 \ldots w_n)$ that maximizes a vector relationship with the centroid vector c, wherein the one or more relationships are one or more linear homogeneous inequalities between the expected returns r of the form $$D_{i1}r_1+D_{i2}r_2+\ldots+D_{in}r_n \geq 0,$$

where $D_{ij}$ are entries of the belief matrix D, where $1 \leq i \leq M$ and $1 \leq j \leq N$, and M and N are finite, natural numbers, the consistent set Q of return vectors is given by $$Q=\{r \in R^N | Dr \geq 0\},$$

the centroid vector c is given by $$c = \int_{r \in Q} r dh,$$

and the vector relationship between the weight vector w and the centroid vector c is an inner product, w·c.

19. The method of claim 18, wherein the criteria for selecting the investment universe includes one or more constraints on the universe, and wherein the weight vector w is determined based on the one or more constraints.

20. The method of claim 19, wherein said constraints include a risk limit, a total investment limit, a liquidity restriction, a risk constraint with market neutrality, or a transaction cost limit.

21. The method of claim 18, wherein the probability measure h is spherically symmetric and centered at the origin and decreases sufficiently rapidly with increasing radius wherein a total probability determined by an integration of the probability measure h over all space is finite.

22. The method of claim 21, wherein the probability measure h is defined by $$h(\rho)=C\rho^{n-1}\exp(-\rho^2/2R^2),$$

where $\rho$ is a magnitude in the set of return vectors, n is the dimensionality of the vectors, R is a scale magnitude, and C is a normalization constant chosen so that the total probability function is equal to one.

23. The method of claim 21, wherein the probability measure h is a distribution uniform on a sphere of radius R.

24. The method of claim 18, wherein the one or more linear homogeneous inequality relationships comprise an ordering of some or all of the expected returns.

25. The method of claim 18, wherein the one or more linear homogeneous inequalities is a plurality of linear homogeneous inequalities between the expected returns, the consistent set is formed from the plurality of orderings, and the centroid vector c is determined under a probability measure that gives equal weight to each return vector in the consistent set.

26. The method of claim 18, wherein the asset returns of the universe are divided into sectors, the assets returns within each sector are interrelated according to a subset of the linear homogeneous inequalities, and the asset returns in different sectors are not interrelated by the linear homogeneous inequalities.

27. The method of claim 26, wherein the linear homogeneous inequalities do not include information regarding assets in a sector, the method further comprises the step of computing a superposition of centroids of the remaining sectors of assets for which the linear homogeneous inequalities interrelate asset returns, and averaging the centroid components within the sector where the ordering is not utilized.

28. The method of claim 18, wherein the step of determining the centroid vector c comprises a Monte Carlo computation.

29. The method of claim 26, wherein if the assets are ordered into a plurality of sectors, and the centroid vector c is calculated by performing a Monte Carlo calculation in each sector and forming a superposition of the centroids of each sector.

30. The method of claim 18, wherein the step of determining the centroid vector c comprises calculating the expression $$c_{j,n} = \frac{n!}{(j-1)!(n-j)!} \int_{-\infty}^{\infty} wF(w)^{n-j}(1-F(w))^{j-1} f(w) dw$$
$$= \frac{n!}{(j-1)!(n-j)!} \int_0^1 F^{-1}(z) z^{n-j}(1-z)^{j-1} dz,$$

wherein $c_{j,n}$ is the jth component of an n-dimensional centroid vector, f(w) is the probability density, and F(w) is a cumulative distribution of f(w), and w is defined by $$Prob\left\{\begin{array}{c} w < y_{j,n} < \\ w + dw \end{array}\right\} = \frac{n!}{(j-1)!(n-j)!} F(w)^{n-j}(1-F(w))^{j-1} f(w) dw,$$

wherein $y_{j,n}$ is a jth component of a vector comprising the asset universe sorted into decreasing order.

31. The method of claim 30, wherein the integral is approximated by $$F^{-1}(z_{mean}), \text{ wherein } z_{mean} = \frac{n-j+1}{n+1}.$$

32. The method of claim 30, wherein the probability distribution is a normal distribution and, the integral is approximated by the Blom approximation $$c_{j,n} \approx F^{-1}\left(\frac{n+1-j-\alpha}{n-2\alpha+1}\right),$$

wherein $\alpha$ is a parameter in the range from about 0 to about 1.

33. The method of claim 32, wherein $\alpha$ is defined by the formula $\alpha = A - Bj^{-\beta}$, wherein A, B, and $\beta$ are determined by comparing the Blom approximation to a numerical integration of the expression for $c_{j,n}$.

34. The method of claim 32, wherein $\alpha$ is defined by the formula $\alpha = A - Bj^{-\beta}$, wherein A is about 0.4424, B is about 0.1185, and $\beta$ is about 0.21.

* * * * *